US006377295B1

United States Patent
Woodgate et al.

(10) Patent No.: US 6,377,295 B1
(45) Date of Patent: *Apr. 23, 2002

(54) OBSERVER TRACKING DIRECTIONAL DISPLAY

(75) Inventors: Graham John Woodgate, Henley-on-Thames; Richard Robert Moseley, Bourton-on-the-Water; David Ezra, Wallingford, all of (GB)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,350

(22) Filed: Aug. 12, 1997

(30) Foreign Application Priority Data

Sep. 12, 1996 (GB) .............................................. 9619097

(51) Int. Cl.⁷ ................................................. H04N 9/47
(52) U.S. Cl. ......................................... 348/59; 359/463
(58) Field of Search ............................. 348/59, 60, 51, 348/169, 170, 561, 56; 359/462, 463, 464, 630; 349/15; 345/139; 374/4; 473/2; 356/139.03; 351/237

(56) References Cited

U.S. PATENT DOCUMENTS

| | | | | |
|---|---|---|---|---|
| 3,805,073 A | * | 4/1974 | Jayachandra et al. | 374/4 |
| 4,882,676 A | * | 11/1989 | Van De Kop et al. | 473/2 |
| 4,991,022 A | * | 2/1991 | Canfield et al. | 348/561 |
| 5,083,199 A | | 1/1992 | Borner | 358/88 |
| 5,264,964 A | | 11/1993 | Faris | 359/465 |
| 5,583,795 A | * | 12/1996 | Smyth | 359/630 |
| 5,621,424 A | * | 4/1997 | Shimada et al. | 348/56 |
| 5,712,732 A | * | 1/1998 | Street | 359/630 |
| 5,777,720 A | * | 7/1998 | Shapiro et al. | 351/237 |
| 5,808,792 A | * | 9/1998 | Woodgate et al. | 348/59 |
| 5,838,432 A | * | 11/1998 | Tokuhashi et al. | 356/139.03 |

FOREIGN PATENT DOCUMENTS

| | | |
|---|---|---|
| DE | 19500699 | 7/1996 |
| EP | 0404289 | 12/1990 |
| EP | 0625861 | 11/1994 |
| EP | 0721131 | 7/1996 |
| EP | 0726482 | 8/1996 |
| EP | 0769881 | 4/1997 |
| GB | 2145897 | 4/1985 |
| WO | 9420875 | 9/1994 |

OTHER PUBLICATIONS

J. Eichenlaub et al., SPIE, vol. 2219, pp. 395–406, 1994, "An In Cockpit 'Situation Awareness' Autostereoscopic Avionics Display,".

H. Imai et al., SPIE, vol. 2653, pp. 49–55, 1996, "Eye–Position Tracking Stereoscopic Display Using Image Shifting Opticals,".

Search Report for Application No. GB 9619097.0; dated Dec. 12, 1996.

* cited by examiner

Primary Examiner—Chris Kelley
Assistant Examiner—Gims Philippe
(74) Attorney, Agent, or Firm—Renner, Otto, Boisselle & Sklar

(57) ABSTRACT

An observer tracking directional display comprises a spatial light modulator associated with a movable parallax optic. An observer tracker determines the position of an observer and controls the position of the optic by way of an electromechanical transducer and a mechanical transmission. The mechanical tracking arrangement has a plurality of stationary positions for the parallax optic relative to the spatial light modulator (SLM) and steps between these positions so as to optimize the viewing windows for the current position of the observer.

30 Claims, 16 Drawing Sheets

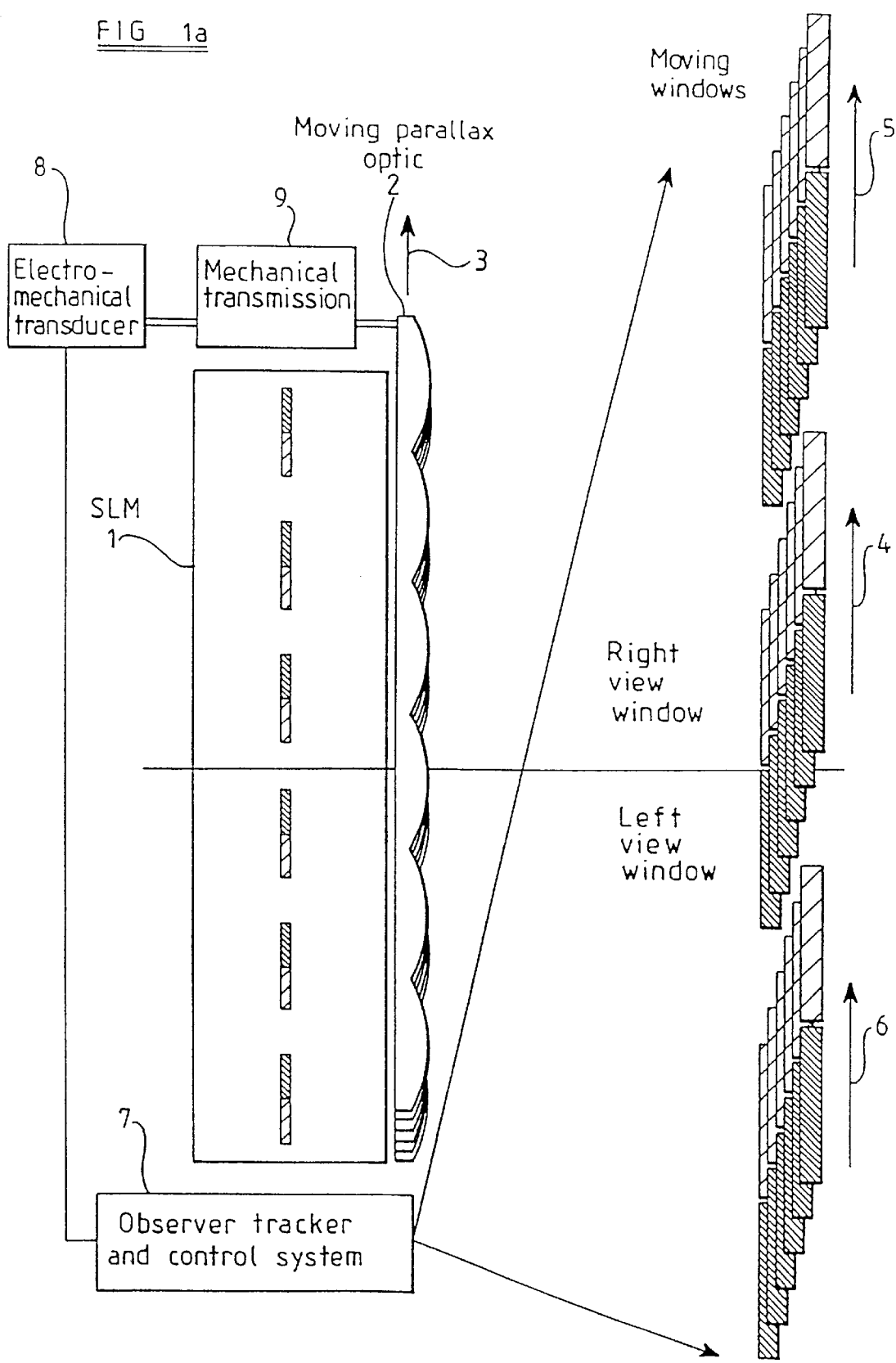

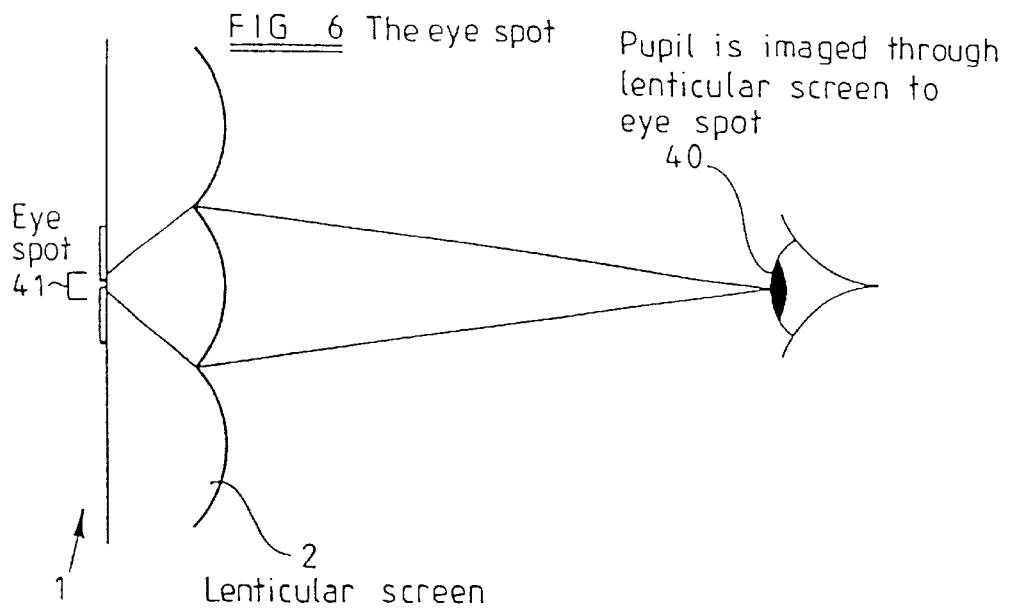
FIG 6 The eye spot
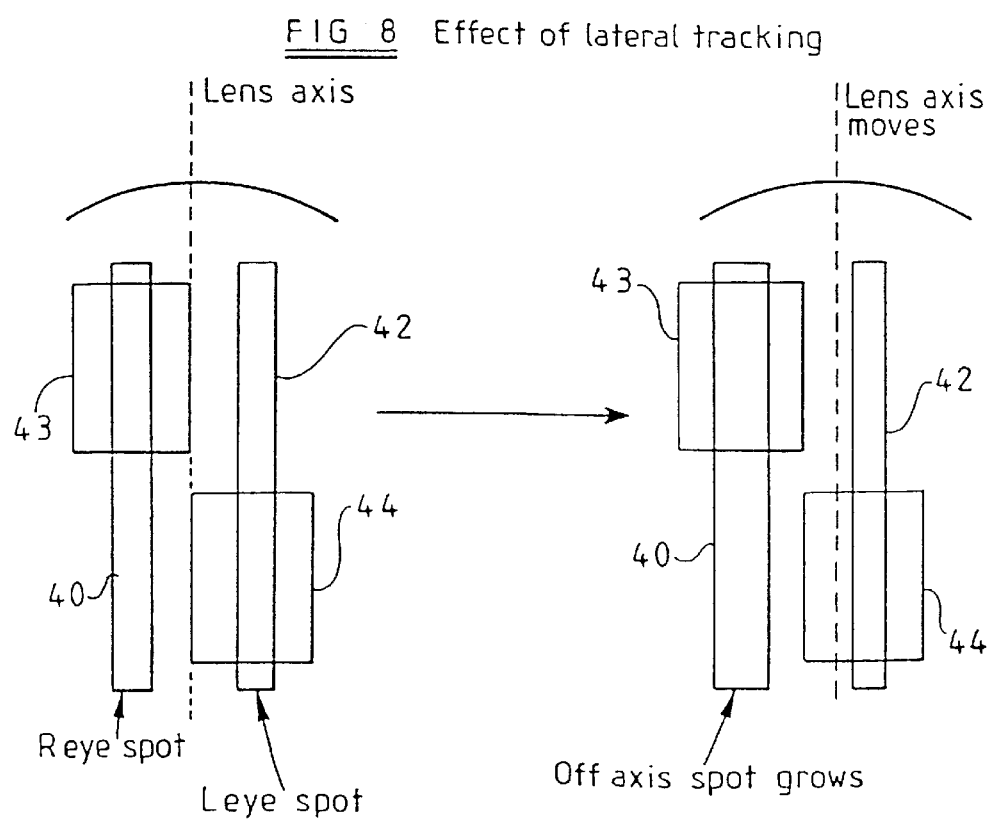
FIG 8 Effect of lateral tracking

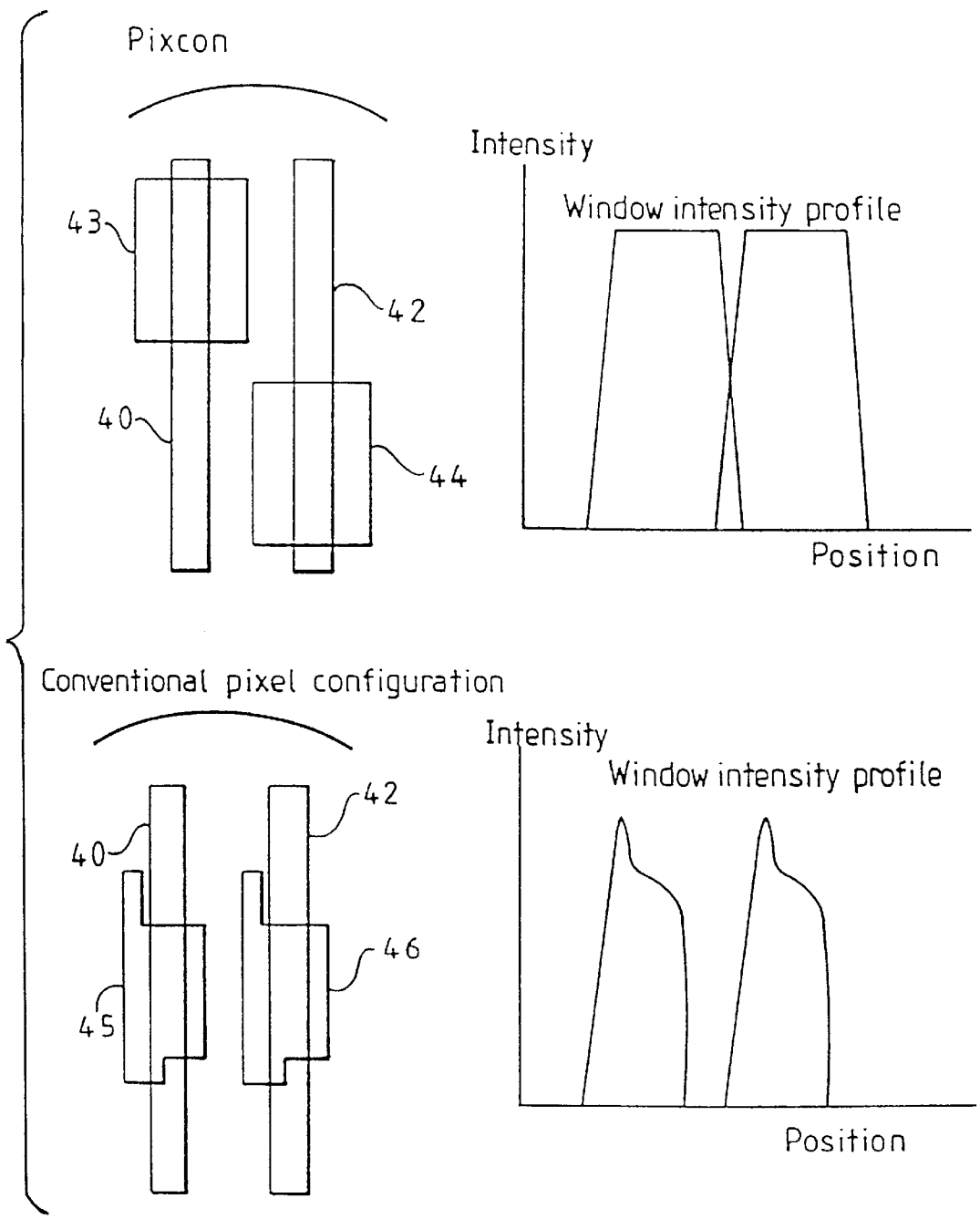
FIG 7  Comparison of eye spot overlap with pixels in pixcon and conventional panels

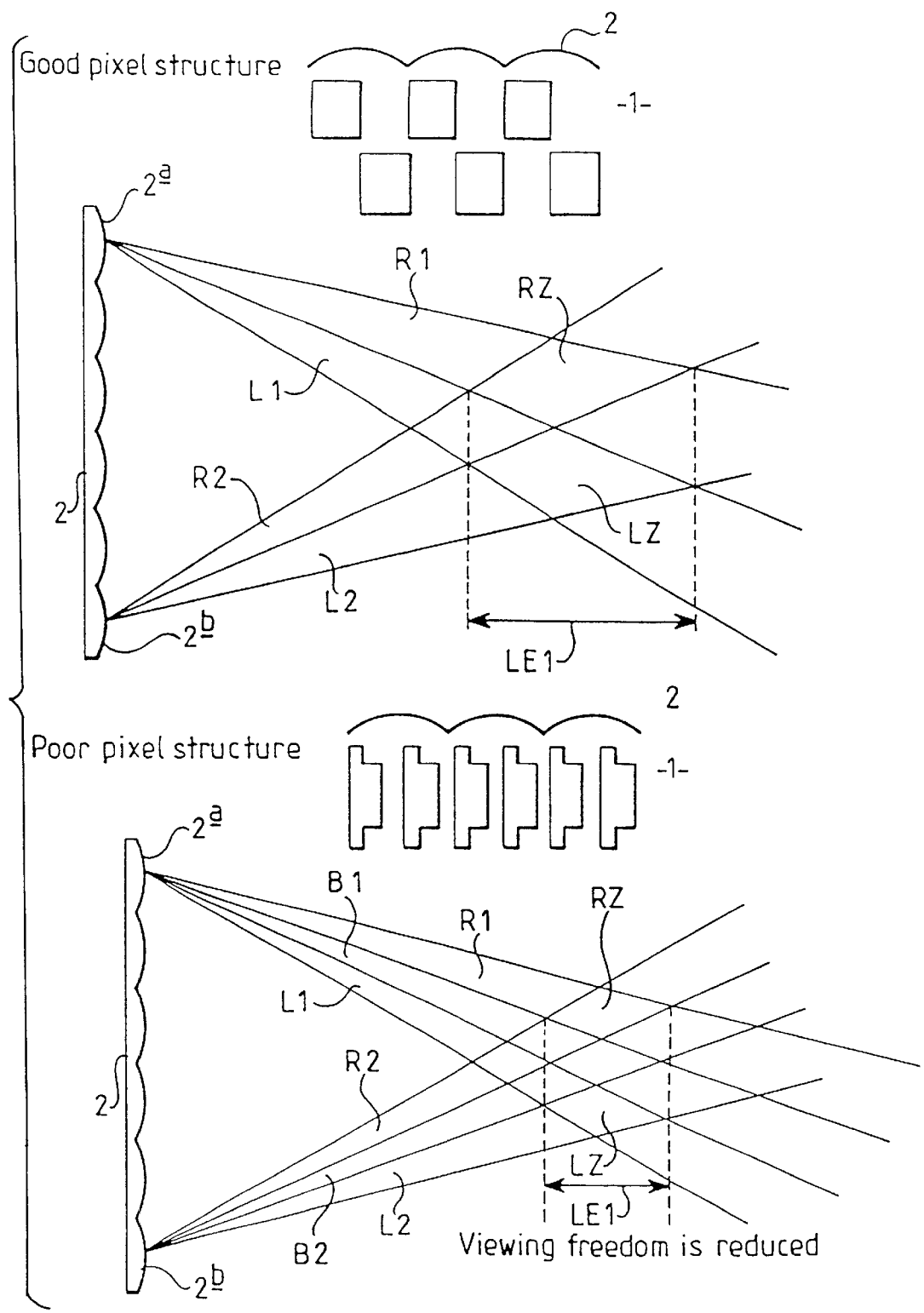
FIG 9 Reduced longitudinal viewing freedom from reduced pixel lateral aperture High image resolution Reduced cross talk from delta panel same panel as non-mechanical tracking Third pixel switched to black/grey level Reduced cross talk high image resolution Black mask between pixels

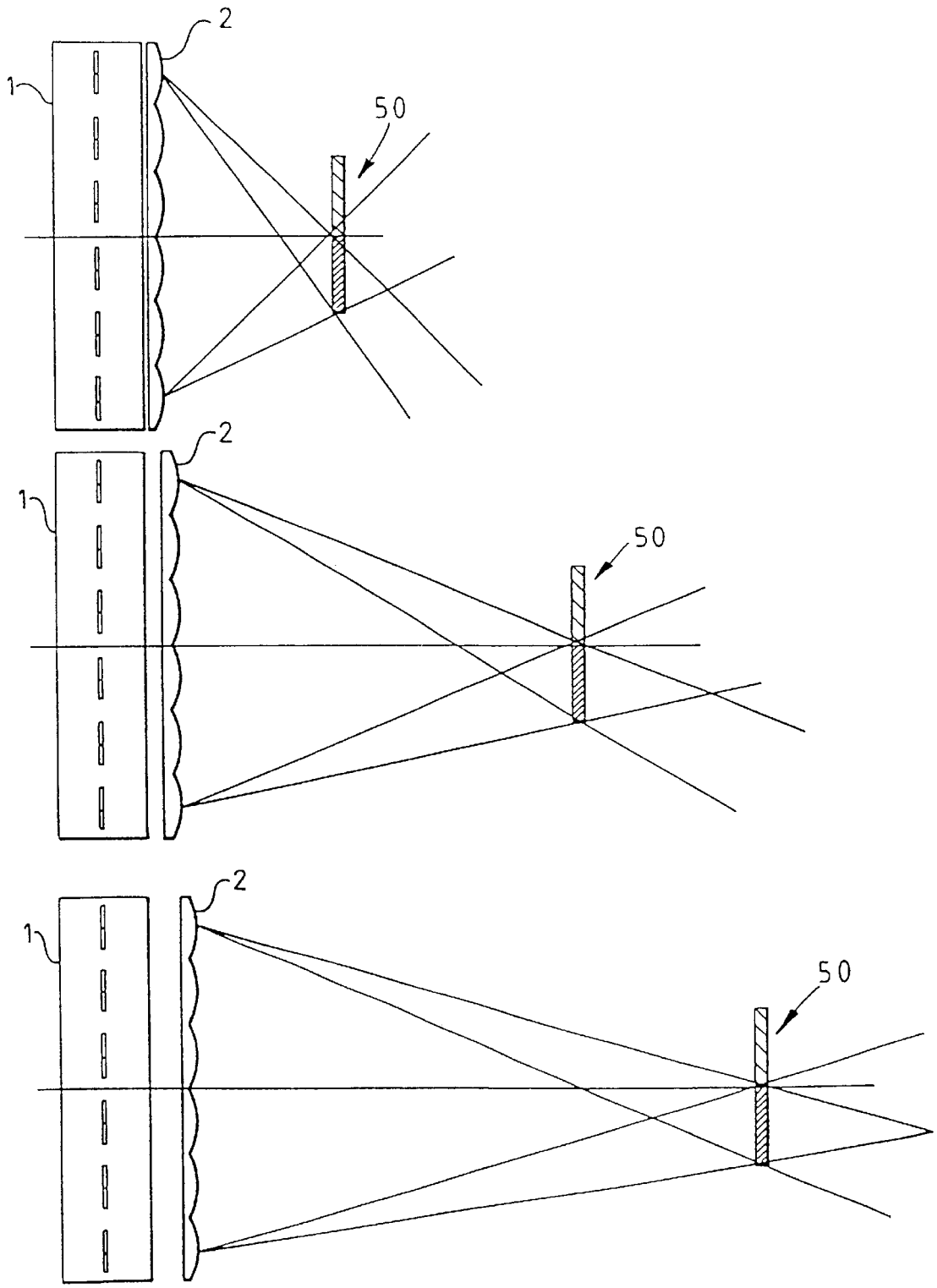
FIG 11 Quantised longitudinal tracking in mechanically tracked 3D displays

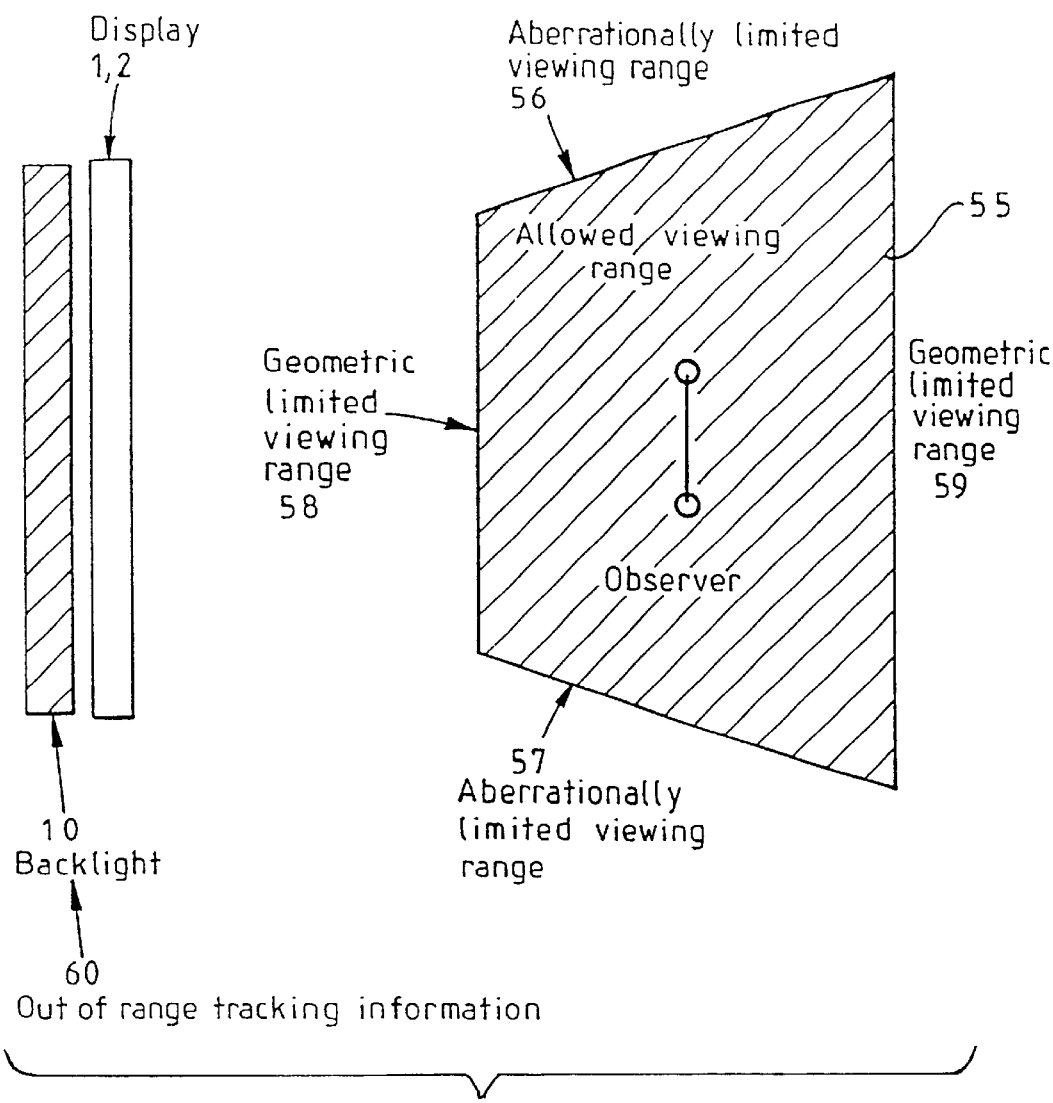
FIG 12 Useful viewing range

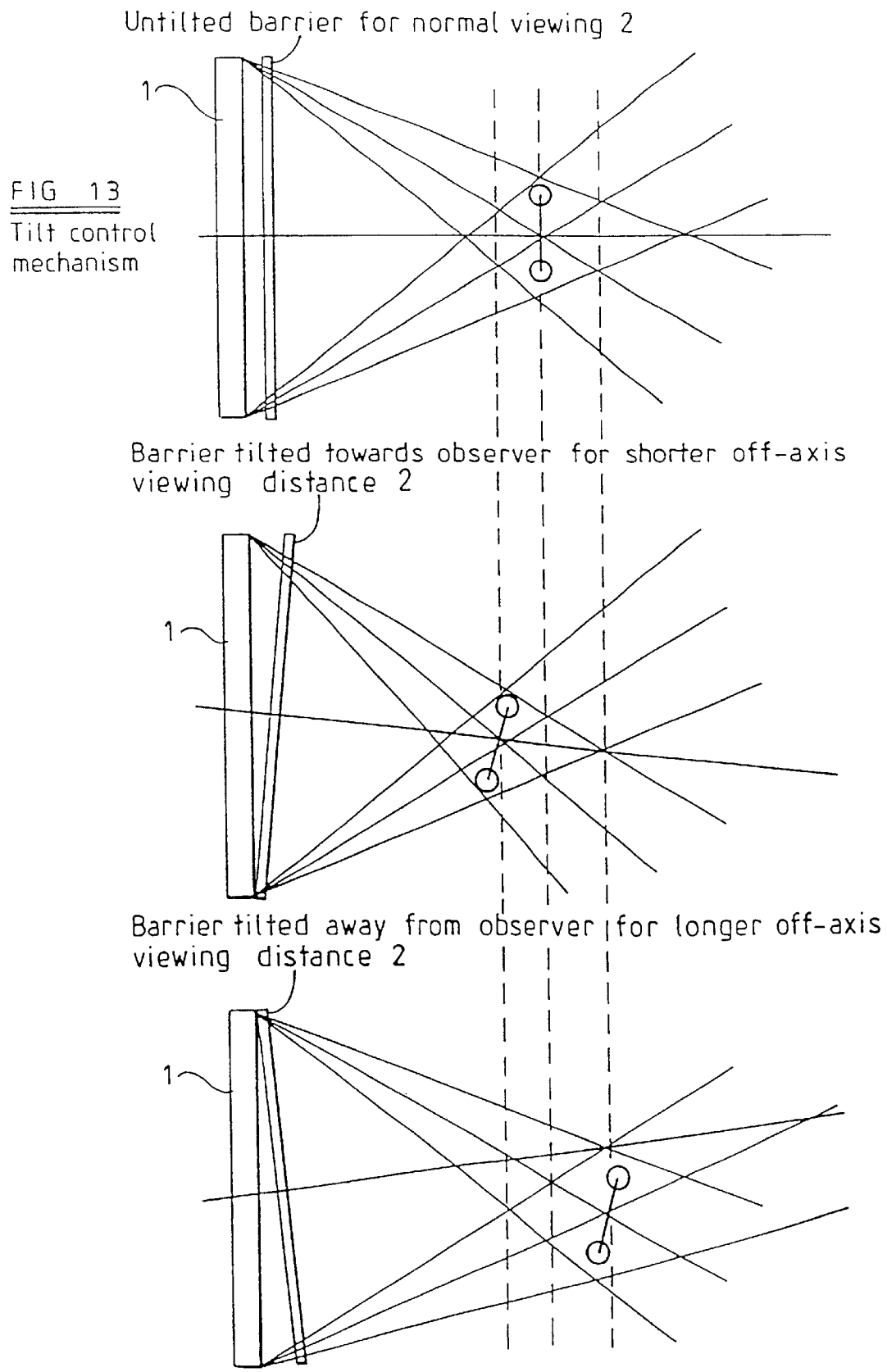

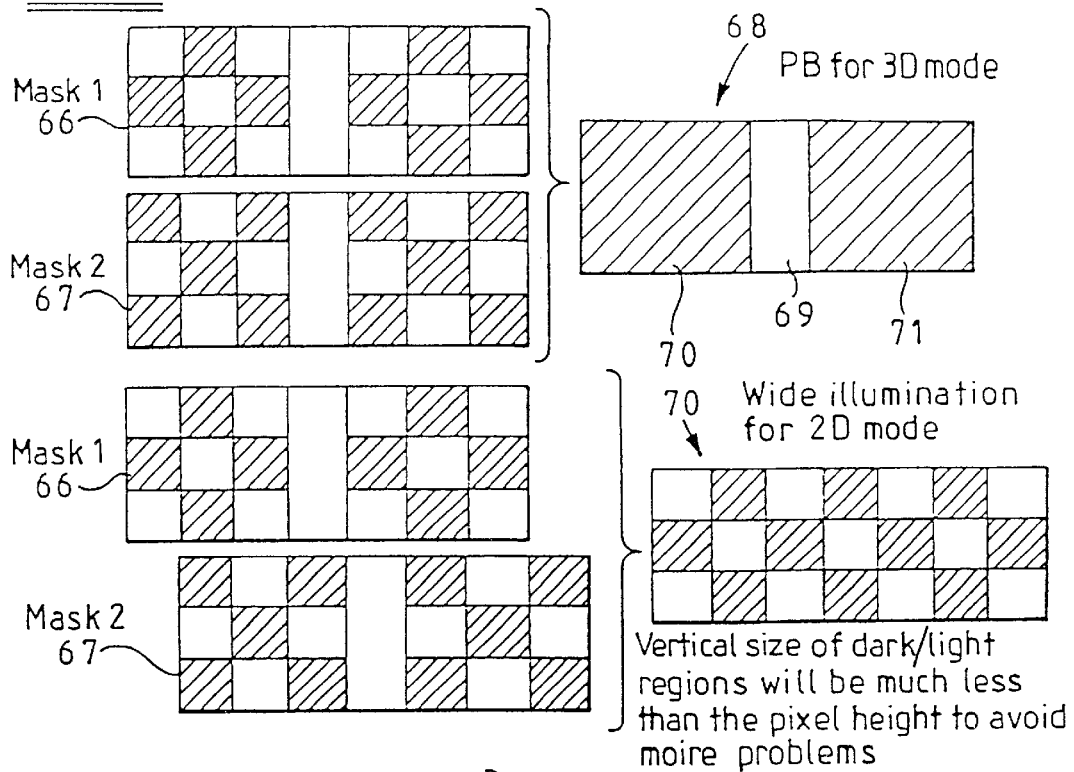
FIG 14
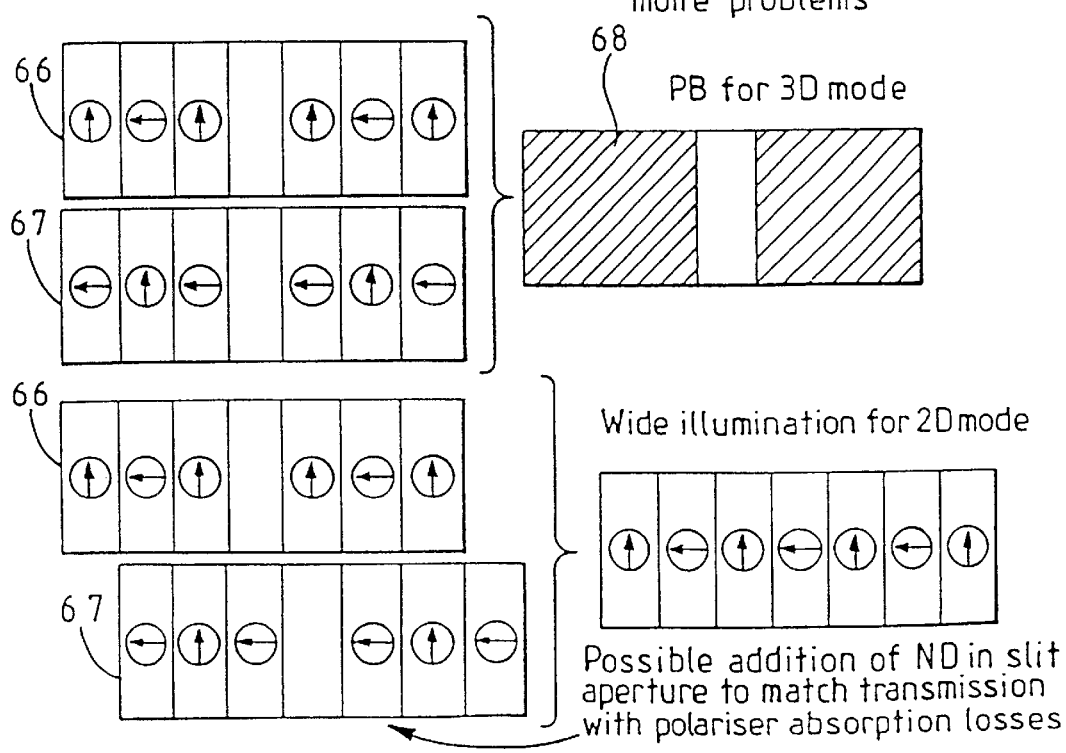
FIG 15  Two moving masks/polarisers approach

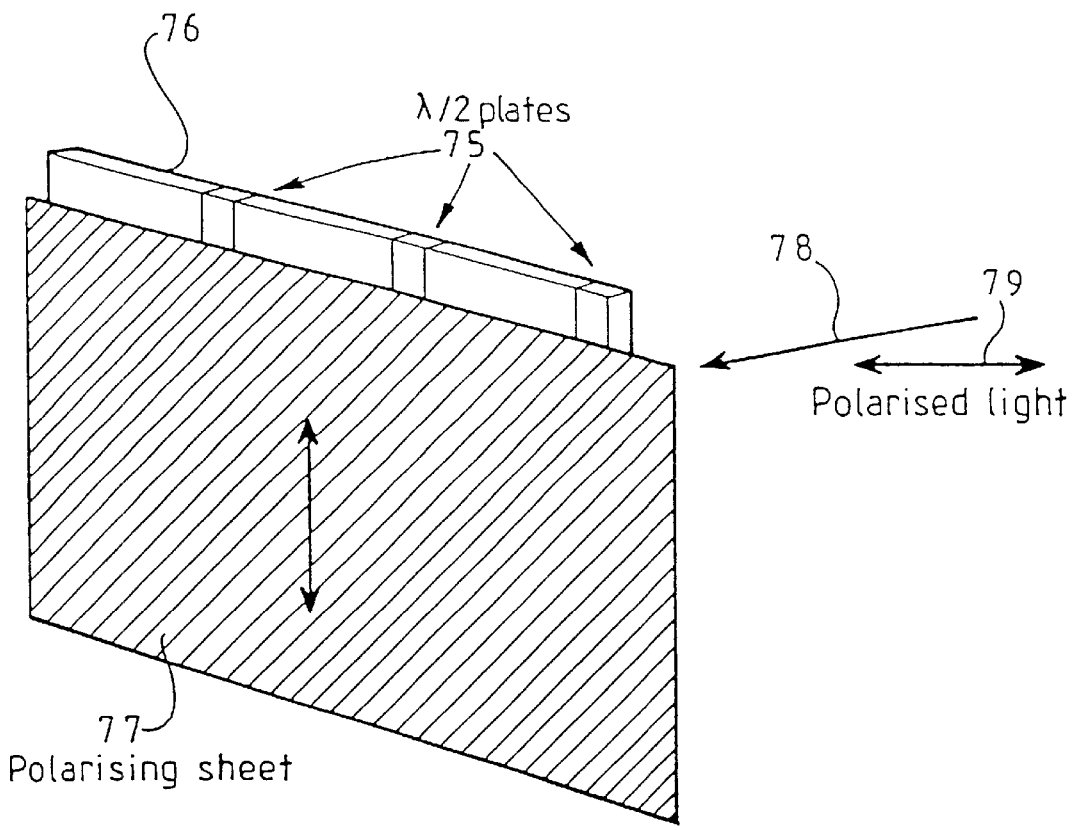
FIG 16    Basic two-element reversible parallax barrier element
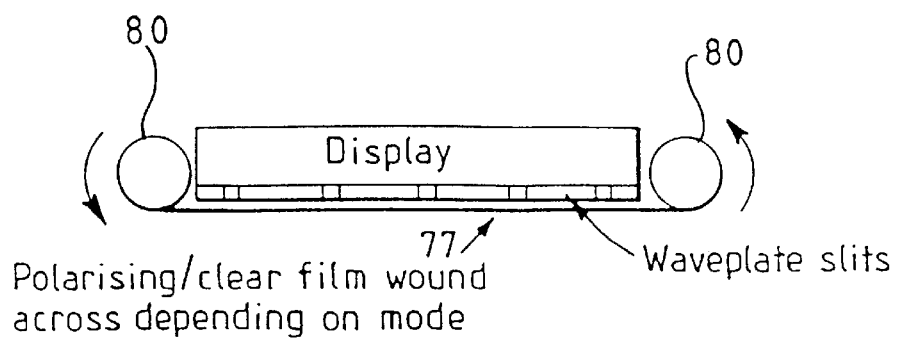
FIG 17    Embodiment with polarising film

OBSERVER TRACKING DIRECTIONAL DISPLAY

The present invention relates to an observer tracking directional display. Such a display may be used as a three dimensional (3D) autostereoscopic display, for instance in 3D television, medical imaging, computer games, telephony, scientific visualisation, virtual reality and office automation equipment.

Observer tracking 3D autostereoscopic displays are disclosed in EP 0 721 131 and EP 0 726 482. These patents are primarily concerned with displays in which observer tracking is achieved in arrangements with no moving parts. However, reference is made to the possibility of using mechanical tracking arrangements.

EP 0 625 861 discloses a spatial light modulator (SLM) of liquid crystal device (LCD) type having a picture element (pixel) configuration which is particularly suitable for use in autostereoscopic displays. In particular, this configuration allows contiguous display windows to be produced and enhanced horizontal display resolution to be achieved. European Patent Application No. 96304959.8 discloses a technique for making SLMs having such a pixel configuration.

"An in-cockpit "situation awareness" autostereoscopic avionics display", J. B. Eichenlaub, T. Touris, SPIE vol. 2219 "Cock-pit Displays" 1994 pages 395 to 406 discloses an observer tracking system for a flat panel display in which viewing windows are switched between discrete positions by switching a light source. However, such an arrangement has a number of disadvantages. For instance, switching takes place so that one light source has to be switched off while another is switched on. If this is not done accurately or if there is a decay of the phosphors of the lamps, the display will appear to become brighter or darker during switchover, thus causing significant image flicker. Also, the intensities of the light sources must be matched in order to avoid unwanted image flicker which would be visible as an observer moved position. Further, if a large number of individual positions is required, then a large number of lamps will be required, thus increasing the display cost and bulk. Additionally, an arrangement for mechanically translating a lenticular screen to allow observer tracking is disclosed.

EP 0 404 289 discloses a 3D display in which an observer is tracked by moving a curved lenticular screen with respect to an image display. The lenticular screen can be moved laterally and longitudinally so as to track observer movement. However, no details of tracking are disclosed.

"Eye-position tracking stereoscopic display using image shifting optics", H. Imai et al, SPIE vol. 2653, (1996) pages 49 to 55 discloses an arrangement in which an image is projected onto the rear of a lenticular screen and is tracked with respect to the screen by moving the projection optics in accordance with the measured position of an observer.

U.S. Pat. No. 5,264,964 discloses a display which is switchable between autostereoscopic and stereoscopic modes of operation by means of mechanical movement.

A known type of autostereoscopic 3D display uses a single display panel, such as a liquid crystal device spatial light modulator, on which several two dimensional (2D) reviews are spatially multiplexed. Vertical slices of the 2D views are interleaved and a parallax optic is used to allow the views to be seen in the intended directions. This creates "viewing windows" as described in more detail hereinafter. The spatial resolution, especially the lateral or horizontal resolution, of the panel has to be shared among the 2D views so that, for N 2D views, each view is displayed with a (horizontal) resolution of R×N, where R is the (horizontal) spatial resolution of the panel. For a large number of 2D views, the (horizontal) resolution has to be sacrificed and/or a panel of higher (horizontal) resolution and hence cost must be used.

Some observer tracking displays of this type require that the viewing windows be repeated in several lobes. This requires that the optical performance, such as aberrational and diffractional performance of the display, particularly of the parallax optic, be sufficient to avoid undesirable visual artefacts from being visible in non-zero lobes.

Some observer tracking displays of this type require good window performance. For instance, to avoid visible variations in intensity or flicker as the observer moves, the intensity may vary laterally across a large part, or even all, of the window by only a relatively small amount. Also, the window edge performance may be critical to avoiding undesirable visual artefacts. For instance, it may be necessary for the windows to be accurately contiguous with minimal overlap and underlap. This can place stringent physical requirements, for instance on the manufacturing tolerances of the components such as the panel and on the accuracy of assembly and alignment of the components.

For some applications, mechanical tracking systems, ie: tracking system with moving parts, may have advantages over non-mechanical systems, ie: systems without moving parts. For instance, in mechanical tracking systems, it is possible to use only two viewing windows in a single lobe, such as the zero order lobe where optical performance is best. For spatially multiplexed single panel displays, this minimises the loss of resolution for each 2D view compared with the spatial resolution of the panel so that lower resolution (and less expensive) panels may be used or the resolution of the 3D image may be improved. The use of only one lobe allows the optical performance requirements of the parallax optic to be relaxed so that a less expensive parallax optic may be used. Because the windows track the observer position, contiguity of the windows may not be necessary and low variation in intensity may be required across only a smaller part of each window. This reduces the physical requirements and the cost of the display.

Although mechanically tracked systems have been suggested, for instance as mentioned hereinbefore, the practical problems of realising such systems have not previously been considered or addressed. For instance, all mechanical tracking systems will have inertia. Thus, although the delays involved in measuring the observer position will be common to all observer tracking displays, the time between detecting a new observer position and causing the display to move the viewing windows to the desired new position is inherently longer for a mechanically tracked system than for a non-mechanical system. Also, there will be backlash in many types of mechanical system resulting in reduced accuracy of positioning of the viewing windows.

According to the invention, there is provided an observer tracking directional display comprising an image display, a parallax device co-operating with the image display to define at least one viewing zone from which the image display is visible, and an observer tracker for determining the position of an observer, characterised by an electromechanical system responsive to the observer tracker for moving the parallax device relative to the image display to any one of a plurality of discrete stationary positions so that the viewing zone tracks the position of the observer.

The mechanical system may be arranged to provide, at least for an observer at a predetermined longitudinal distance from the display, a number n of discrete stationary positions of viewing windows per interocular distance e given by:

$$e/n = V\text{max}.t + \Delta x$$

where Vmax is the maximum lateral observer speed for the display, $\Delta x$ is the lateral position error of the observer tracker and t is the time delay between measurement of an observer position and completion of relative movement between the parallax device and the image display to track an observer movement.

The electromechanical system may be arranged to provide, for an observer at at least one longitudinal distance from the display different from the predetermined distance, a number n' of discrete stationary positions of viewing windows per interocular distance greater than n.

The display may be for three dimensional autostereoscopic viewing, the image display may be arranged to display spatially multiplexed left and right images and the parallax device may be arranged to co-operate with the image display to form left and right viewing windows for left and right eyes, respectively.

The image display may comprise a plurality of picture elements, each of which is of substantially constant vertical aperture across its horizontal aperture. Each of the picture elements may be of substantially rectangular shape. The picture elements may be arranged as pairs of columns with the columns of each pair being substantially horizontally contiguous. The pairs of columns may be spaced apart horizontally.

The image display may comprise a spatial light modulator and a backlight. The spatial light modulator may comprise a liquid crystal device.

The parallax device may comprise a lens array. The lens array may comprise a lenticular sheet.

The parallax device may comprise a hologram array.

The parallax device may comprise a parallax barrier. The parallax barrier may be switchable to a state of uniform transparency for switching the display to a non-directional mode.

The parallax barrier may comprise first and second sheets which are laterally relatively moveable between first and second relative positions, the first sheet comprising a plurality of first transmissive strips separated by first patterns of transmissive and non-transmissive regions, the second sheet comprising a plurality of second transmissive strips separated by second patterns of transmissive and non-transmissive regions which are complementary to the first patterns and arranged such that, in the first relative position, the first strips are aligned with the second strips and the non-transmissive regions of the first and second patterns are aligned with the transmissive regions of the second and first patterns, respectively, and such that, in the second relative positions, the first and second transmissive strips are aligned with the first and second patterns, respectively, and the transmissive regions of the first and second patterns are aligned with each other.

The parallax barrier may comprise superimposed first and second sheets which are laterally moveable between first and second relative positions, the first sheet comprising a plurality of first transmissive strips, each pair of which is separated by alternate strips of first and second orthogonal polarisations, the second sheet comprising a plurality of second transmissive strips, each pair of which is separated by alternate strips of the second and first polarisations such that, in the first relative position, the first transmissive strips are aligned with the second transmissive strips and the strips of the first and second polarisations of the first sheet are aligned with the strips of the second and first polarisations, respectively, of the second sheet and such that, in the second relative position, the strips of the first and second polarisations of the first sheet are aligned with the strips of the first and second polarisations, respectively, of the second sheet.

The image device may be arranged to supply light which is polarised in a first direction and the parallax barrier may comprise: a patterned polarisation rotator having first slit-shaped regions separated from each other by second regions, the first and second regions being arranged to supply light of orthogonal first and second polarisations, respectively; and a polariser arranged to transmit light of the first polarisation and substantially to block light of the second polarisation.

The image display may be a light-emissive display.

The separation of the viewing windows corresponding to adjacent ones of the discrete stationary positions may be greater than the accuracy of the observer tracker.

The electromechanical system may comprise an electromechanical transducer connected by a mechanical transmission to the image display or the parallax device. In a first embodiment, the transducer comprises a stepper motor. In a second embodiment, the transducer comprises a servo motor. In a third embodiment, the transducer comprises a voice coil stage. The electromechanical system may comprise a relative movement step encoder. The electromechanical system may comprise a relative position reference detector.

The applicant is the first to realise that, although continuous tracking systems in which the window positions can be continuously adjusted are possible, at least in theory, they would involve certain intrinsic problems when reduced to practice. In order for an observer tracking display to function correctly, the system for detecting the observer position must be correctly interfaced with the system for moving the windows so that the windows track the observer with sufficient accuracy. The signals used to drive the window moving system may be derived from the observer position data by a calculation technique or by a calibration technique. The calculation technique calculates, for each new observer position, the required movement of the moving parts of the optical system and is based on a mathematical model of the whole display. For this technique to provide sufficiently accurate window positioning with a sufficiently small time delay so that the observer can be satisfactorily tracked, a substantial amount of processing power is necessary which gives rise to substantial cost and complexity.

The required processing power can be reduced by using the alternate calibration technique, for instance as disclosed in EP 0 769 881. In this case, the display is calibrated at a plurality of calibration points. For instance, an observer or a sensor moves to a set of positions evenly distributed about the viewing region of the display and, at each position, the viewing windows are controlled manually or automatically to be in the optimun location for viewing the display from that position. The position signal from the observer position measuring system is then associated with the control signals to the mechanical display tracking system, for instance in a look-up table. If a sufficiently large density of calibration points is provided throughout the viewing region, observer tracking may be performed simply by using a look-up operation which requires minimal calculation and hence minimal processing power. However, to obtain the required density throughout an adequate viewing region, a very large number of calibration points is required so that a large and hence expensive memory capacity must be provided. Also, a large number of calibration points makes the calibration time-consuming and hence increases the expense. The memory requirement and the calibration time may be reduced by substantially reducing the density of calibration points and performing interpolation for observer positions away from the calibration points. However, this substantially increases the processing requirement with the disadvantages mentioned hereinbefore.

The applicant is also the first to realise that the number of discrete window positions can be optimised. Too many window positions require better optical performance of the display, for instance in terms of the aberrational or diffractional performance of the parallax device. Too many positions leads to more calibration points being required. Thus, by optimising the number of window positions with respect to the maximum observer speed and observer position measurement error, acceptable performance can be provided at minimum cost.

It is thus possible to provide an electromechanically tracked display using moving parts which are moved in a stepwise manner and, for instance, using pixel configurations of the type disclosed in EP 0 625 861. Accurate lateral contiguity of pixels is not essential so that, for instance, an LCD panel may be used having less stringent tolerance requirements. The display is tolerant of backlash in the moving parts, such as in a mechanical transmission, and allows reduced resolution, accuracy and repeatability of the tracking system. Relatively large system lags or delays can be tolerated and a relatively simple translation control system may be used. Thus, a display of reduced cost and increased robustness can be provided.

Such a display exhibits reduced intensity fluctuations as an observer moves laterally with respect to the display. The display is tolerant of a larger range of interocular separations of observers and provides increased lateral and longitudinal viewing freedom.

The present invention will be further described, by way of example, with reference to the accompanying drawings, in which:

FIG. 1a is a diagram illustrating a mechanically tracked flat panel autostereoscopic display constituting an embodiment of the invention;

FIGS. 1b to 1d illustrate modifications of the display shown in FIG. 1a;

FIG. 6 illustrates the mechanism resulting in "eye spot";

FIG. 7 illustrates the effects of eye spot overlap with pixel arrangements of the type shown in FIGS. 2 and 4;

FIG. 8 illustrates the effect of lateral tracking with a pixel configuration of the type shown in FIG. 4;

FIG. 9 illustrates the effect of pixel shape on viewing freedom in mechanically tracked displays;

FIG. 11 illustrates "quantised" longitudinal tracking in a display of the type shown in FIG. 1a;

FIG. 12 illustrates the useful viewing range of a display of the type shown in FIG. 1a;

FIG. 13 illustrates operation of a tilt control mechanism for observer tracking in a mechanically tracked display;

FIG. 14 illustrates a first technique for switching between 2D and 3D modes;

FIG. 15 illustrates another technique for switching between 2D and 3D modes;

FIG. 16 illustrates a further technique for switching between 2D and 3D modes;

FIG. 17 illustrates a mechanism for mode switching in the technique illustrated in FIG. 16.

Like reference numerals refer to like parts throughout the drawings.

Figure 1B:
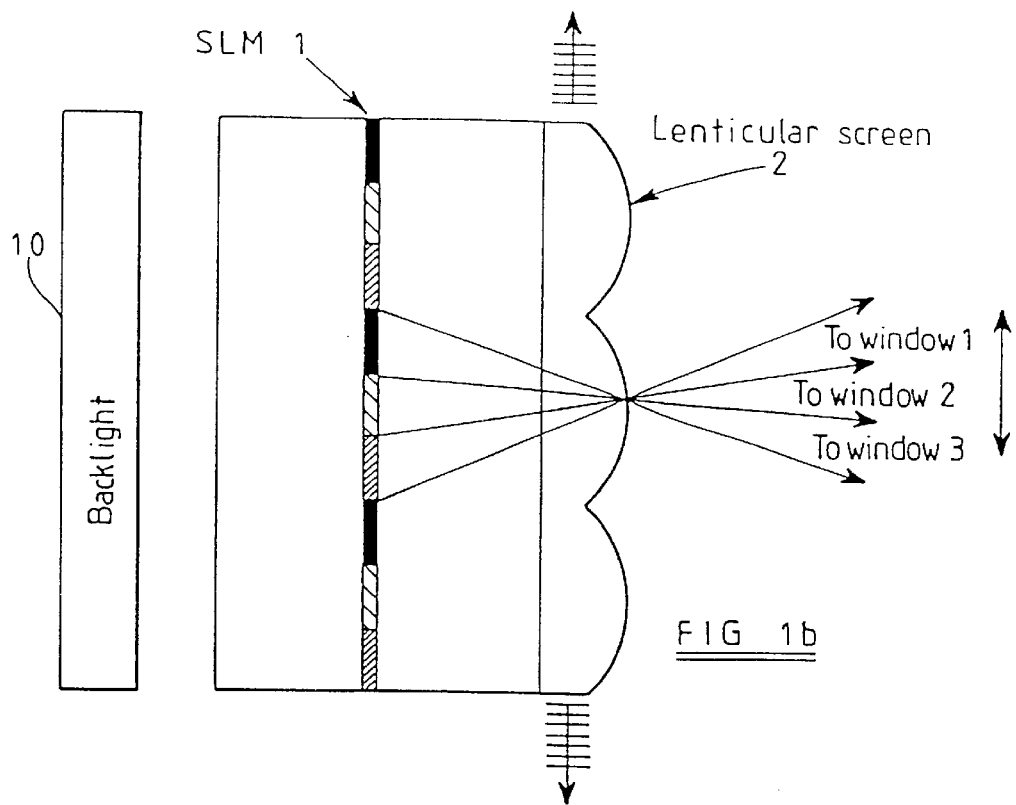

The flat panel autostereoscopic 3D display shown in FIG. 1a comprises an SLM 1, for instance in the form of a thin film transistor twisted nematic LCD, which is illuminated from the rear by a backlight (not shown). The display is arranged to supply left and right views for the left and right eyes, respectively, of an observer. The SLM 1 has a plurality of pixels arranged as rows and columns and displays left and right eye views in a spatially multiplexed format. In particular, alternate columns of pixels display strips of the left and right views, A movable parallax optic 2 is associated with the SLM 1 and comprises a plurality of columns of parallax elements, each of which is associated with an adjacent pair of columns of pixels. The combination of the parallax optic 2 and the SLM 1 produces viewing zones i.e. regions of space from which an eye of the observer can see a single two dimensional (2D) image over the whole of the display. Viewing windows comprise the widest parts of the viewing zones and are located at the nominal observer longitudinal position. The viewing windows are produced in a plurality of lobes such that each lobe provides left and right windows for the left and right eyes, respectively, of the observer.

The parallax optic 2 is movable relative to the SLM 1 so as to move the viewing zones and hence the viewing windows to different locations within a region from which the observer may view the display. By moving the parallax optic 2 laterally, for instance as indicated by an arrow 3, the viewing windows remain in a viewing plane at the optimum position or distance from the display, the windows in the zero, plus 1 and minus 1 lobes moving as shown by the arrows 4, 5 and 6, respectively. The parallax optic 2 may also be movable longitudinally i.e. perpendicularly to the SLM 1, so as to move the viewing plane longitudinally of the display in order to track longitudinal movement of the observer. The window width stays the same but the depth of the viewing zones is changed depending on direction of movement.

The display comprises an observer tracker 7 which determines the position of an observer relative to the display. An example of such an observer tracker is known as Dynasight (™) which uses infrared energy to illuminate the viewing region and detects reflections from a retroreflector worn by the observer. Such a system is available from Origin Instruments Corporation.

The observer tracker 7 includes a control system which is connected to an electromechanical system for moving the parallax optic 2. The electromechanical system comprises an electromechanical transducer 8, such as a stepper motor, servo motor or voice coil stage, connected by a mechanical transmission 9 to the parallax optic 2. The observer tracker and control system 7 supply signals to the electromechanical system so as to move the parallax-optic 2 in a step wise manner to the appropriate one of a plurality of stationary positions which causes the left and right view windows to be located at the left and right eyes, respectively, of the observer.

FIG. 1b shows a display of the type shown in FIG. 1a comprising a backlight 10 for illuminating the SLM 1. The parallax optic 2 is embodied as a lenticular screen disposed between the SLM 1 and the observer. This arrangement provides three viewing windows in each output lobe of the lenticular screen 2.

Figure 1C:
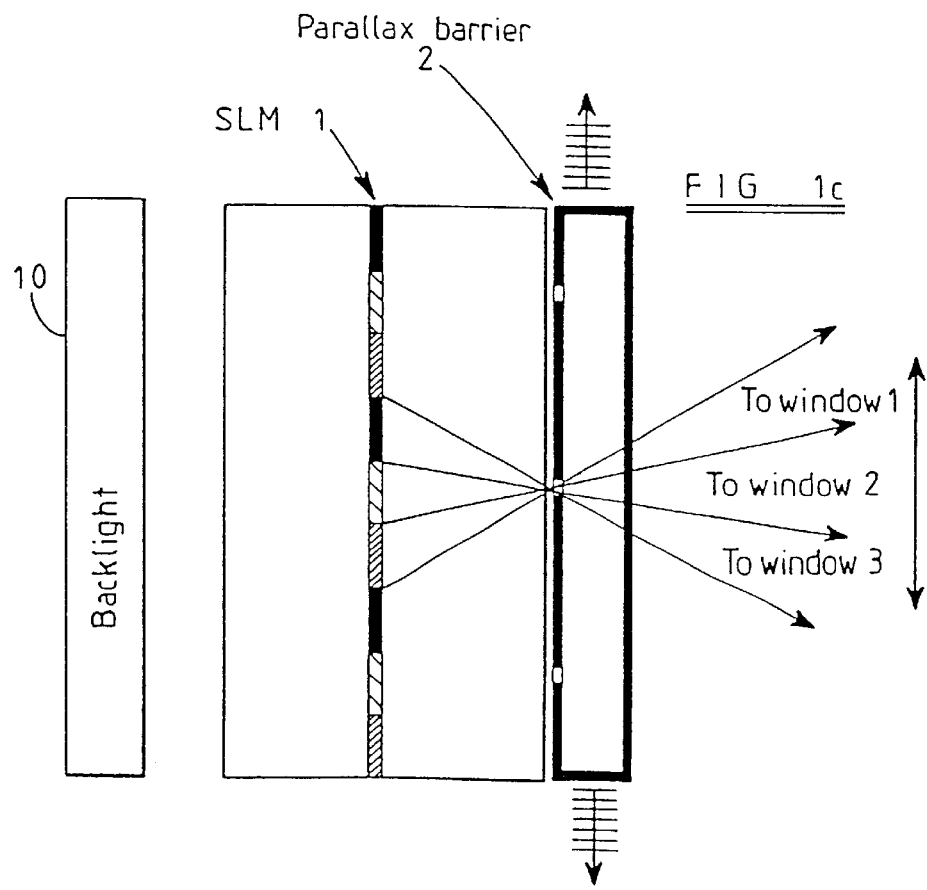

FIG. 1c shows a display which differs from that shown in FIG. 1b in that the lenticular screen is replaced by a parallax barrier 2.

Figure 1D:
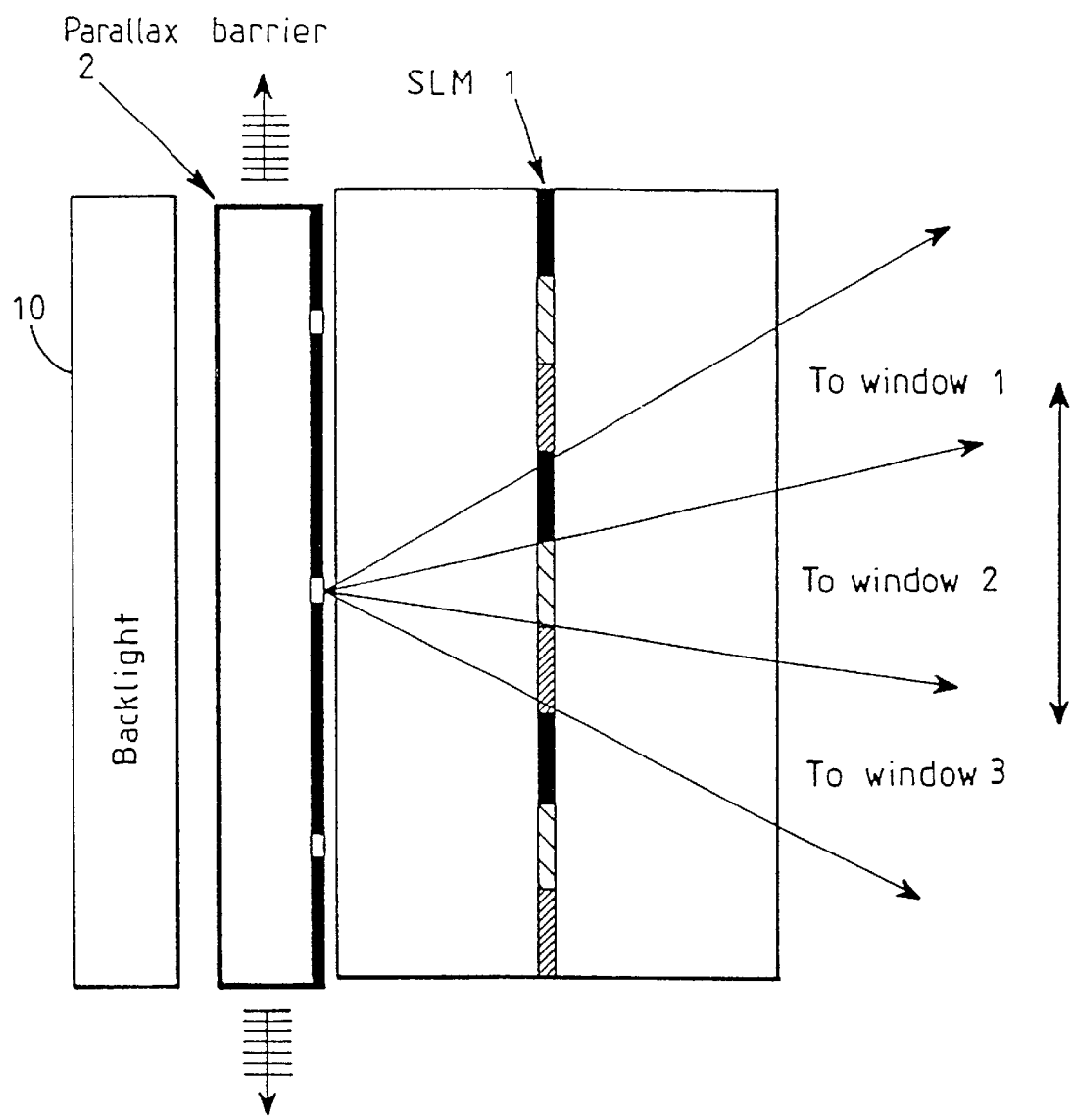

FIG. 1d shows a display which differs from that shown in FIG. 1c in that the parallax barrier 2 is located between the SLM 1 and the backlight 10.

Figure 2:
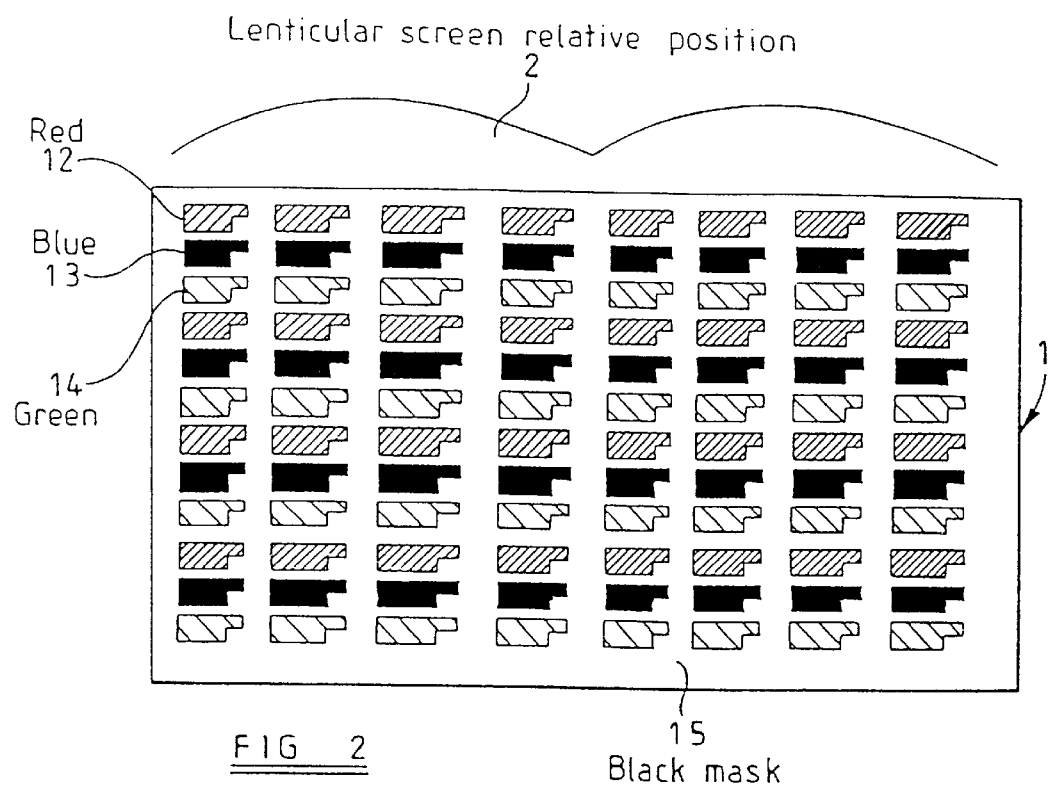
FIG. 2 illustrates a known type of pixel arrangement.

FIG. 2 illustrates a known type of LCD comprising a plurality of pixels arranged as rows and columns in a regular pattern or array. The LCD 1 provides a colour display and comprises red pixels 12, blue pixels 13 and green pixels 14. The pixels are separated from each other by a black mask 15. The black mask 15 obscures components such as transistors, capacitors and electrodes used to control the transmission of the pixels. Thus, each column of pixels is separated from each adjacent column by a continuous vertical opaque strip of the black mask 15.

The LCD 1 is shown in association with a front lenticular screen 2 to provide a display of the type shown in FIG. 1b. The lenticular screen 2 comprises a plurality of vertically extending lenticules, each of which is optically cylindrically converging. The lenticules extend vertically and may be formed, for instance, as piano-convex cylindrical lenses as graded refractive index (GRIN) cylindrical lenses, or as diffractive optical elements. Each lenticule is disposed above a plurality of columns of pixels (four columns as shown in FIG. 2) and each column of pixels provides a vertical slice of a 2D view. The shape of each pixel is rectangular with a small rectangular extension projecting from the right side of each pixel.

Figure 3:
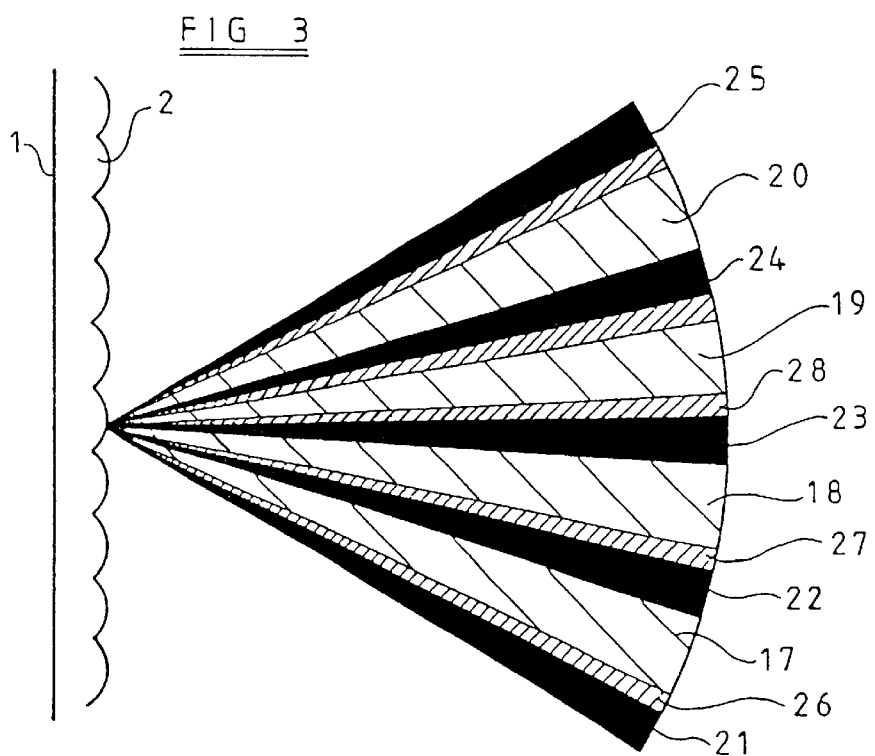
FIG. 3 illustrates use of the arrangement of FIG. 2 in an autostereoscopic display.

As illustrated In FIG. 3, when the display is suitably illuminated and image data are supplied to the pixels of the LCD 1 such that each column of pixels displays a thin vertical slice of a 2D image, each lenticule of the screen 2 provides output light beams 17 to 20 from the respective four columns of pixels associated with the lenticule. The directions in which the light beams 17 to 20 extend correspond to the directions from which the respective 2D views were recorded during image capture. When viewed by an observer whose eyes receive adjacent ones of the light beams 17 to 20, a 3D image is perceived.

However, the vertical portions of the black mask 15 between the columns of pixels are also imaged in the directions indicated at 21 to 25. Further, the light beams 17 to 20 contain regions such as 26 to 28 of reduced brightness corresponding to imaging of the rectangular protrusions extending from the main pixel regions. Thus, the output of the display does not have continuous parallax of even illumination.

Figure 4:
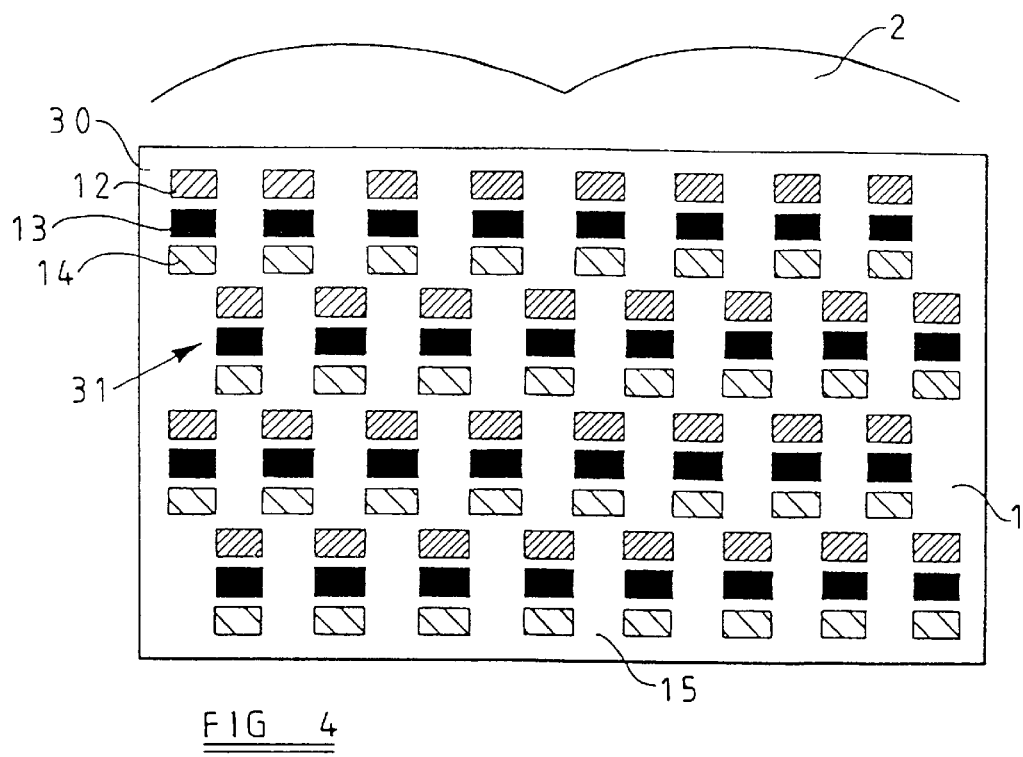
FIG. 4 shows a pixel arrangement suitable for use in autostereoscopic displays.

In the display shown in FIG. 4, the LCD 1 differs from that shown in FIG. 2 in that the pixels are arranged in a different pattern of horizontal rows and vertical columns. In particular, each pixel may be a composite pixel comprising a red pixel 12, a blue pixel 13 and a green pixel 14. The pixels are arranged such that they are contiguous in the horizontal direction. In other words, there are no continuous vertical black mask portions separating the pixels. To achieve this, each composite pixel 30 in a first row is spaced vertically from a horizontally adjacent composite pixel 31 in a second row but the right hand edge of the composite pixel 30 lies on the same vertical line as the left hand edge of the composite pixel 31. Thus, compared with FIG. 2, the number of columns of pixels imaged by each lenticule of the screen 2 has been doubled to 8 whereas the vertical resolution of the LCD 1 has effectively been halved.

Figure 5:
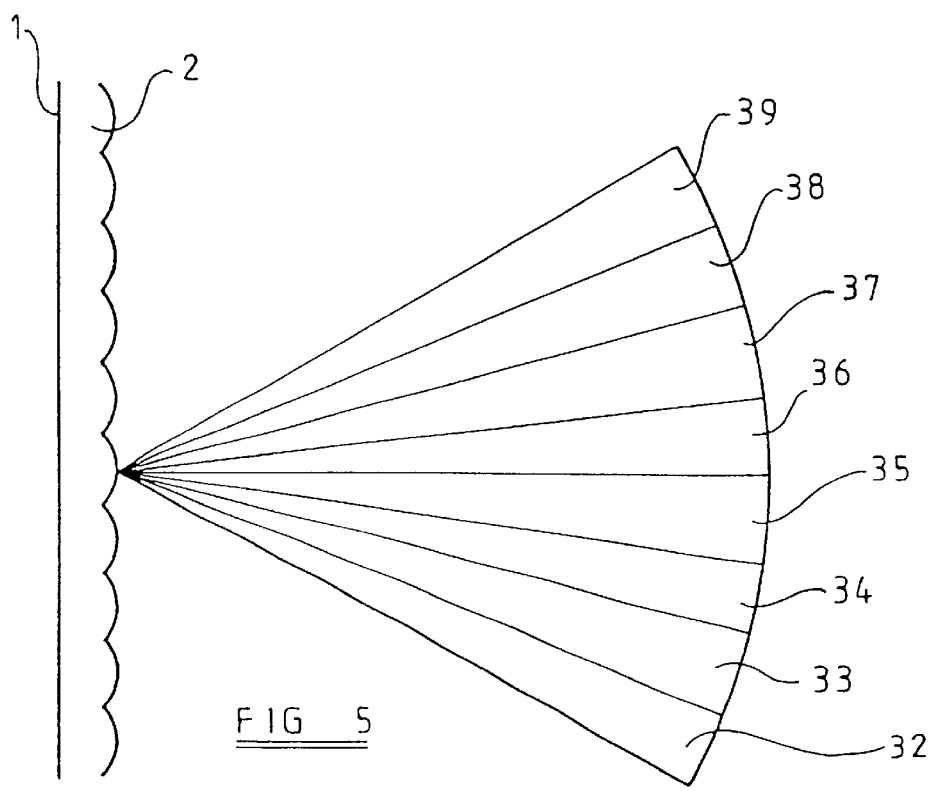
FIG. 5 illustrates the performance of a display using the arrangement of FIG. 4.

As shown in FIG. 5, each lenticule of the screen 2 supplies eight output light beams 32 to 39 which are angularly contiguous with each other and which represent eight different 2D views with continuous horizontal parallax Thus, "black" regions such as 21 and "grey" regions such as 26 in FIG. 3 are eliminated and an observer can perceive a 3D image of substantially constant intensity and without image gaps.

The pixel configuration shown in FIG. 4 is that disclosed in EP 0 625 861. Because the vertical apertures of the pixels are constant, movement of an observer eye within each viewing window does not give rise to any undesirable visual artefacts. In particular, the image brightness is substantially constant so that no flicker or changes in brightness occur as an observer moves.

The arrangements shown in FIGS. 1b, 1c, 1d, 2 and 4 have more than two columns of pixels per optical element, such as each lenticule, and hence provide more than two viewing windows. In most mechanically tracked displays, it is preferable to have only two columns of active pixels per optical element, and hence only two viewing windows, so as to maximise display resolution.

It is not necessary for the columns of pixels of the LCD of FIG. 4 to be accurately contiguous in the lateral or horizontal direction. Because of the nature of the tracking arrangement as described hereinafter, some underlap or overlap of adjacent pixel columns can be tolerated because it gives rise to no undesirable visual artefacts. For example, "Super High Aperture" LCD panels from Sharp Corporation have a black mask width approximately 10% of pixel pitch.

Parallax barrier systems, for instance of the type shown in FIGS. 1c and 1d, have an optical resolution limited by the slit width due to the geometrical width of the slit and diffraction effects of the slit, Lenticular screens, for instance as shown in FIG. 1b, have a resolution limited by aberrations, scatter, defocus and defects in thickness and pitch. In each case, the pupil of an observer's eye is imaged to a spot or strip of finite size at the plane of the SLM 1. This is referred to as an "eye spot". FIG. 6 illustrates how the pupil 40 of the observer's eye is imaged by each lenticule of the screen 2 to an eye spot 41 in the form of a vertical stripe of finite width. Thus, the eye of the observer receives light from within the whole of the eye spot when the display is in use. The width and intensity profile of the eye spot vary with viewing position.

The upper part of FIG. 7 shows the position and size of the eye spots 40 and 42 imaged at pixels 43 and 44 of an LCD having the pixel configuration illustrated in FIG. 4. The upper part of FIG. 7 also illustrates the window intensity profile with lateral position of the eye spots 40 and 42 with respect to the pixels 43 and 44. At the nominal viewing position, the eye spots cover the centres of the two adjacent pixels 43 and 44. The mechanical steering system shown in FIG. 1a provides movement of the parallax optic 2 with respect to the SLM 1 so that the eye spots 40 and 42 are nominally positioned about the centre of the pixels as the observer moves, for instance as illustrated in FIG. 8. In the case of a lenticular screen, however, as the lenticules move such that their axes are displaced from the vertical line which is substantially co-linear with adjacent vertical edges of the pixels 43 and 44, optical aberrations of the lenticules increase the widths of the eye spots. The allowable viewing freedom of the display is limited by the condition that the spots must remain within the pixel. Accordingly, there is an aberrational limit on the lateral size of the viewing zone. It is therefore desirable that the pixels be made as wide as possible to extend the lateral viewing freedom. The pixel configuration shown in FIG. 4 thus provides a relatively large lateral viewing freedom for a mechanically tracked display of the type shown in FIG. 1a.

By way of comparison, the lower part of FIG. 7 illustrates eye spot overlap for another conventional pixel configuration with the pixels shaped as shown at 45 and 46. The window intensity profile for this configuration is also shown and illustrates that any movement of the eye spots 40 and 42 with respect to the pixels 45 and 46 will give rise to intensity variation so that the brightness of the images perceived by the observer will vary with movement of the observer. Dynamic intensity fluctuations of more than 5% can be seen by an observer as image flicker.

In order for an observer to see the left and right images across the whole of the display, view point correction is provided. As shown in the upper part of FIG. 9 for a pixel configuration of the type shown in FIG. 4, the pitch of the parallax elements of the parallax optic 2 is slightly less than the pitch of the pairs of columns of pixels. Thus, the parallax element 2a at the right hand side of the display produces light "wedges" L1 and R1 corresponding to the left and right eye image slices. Similarly, the parallax element 2b at the left hand side of the display produces light wedges L2 and R2 for the left and right eye view slices of the pixel columns aligned with the element 2b. The other parallax elements produce similar left and right eye light wedges directed towards left and right eye viewing zones LZ and RZ. Provided the left eye of the observer remains within the left eye viewing zone LZ, the left eye will see the left eye image across the whole of the display. Similarly, provided the right eye of the observer remains within the right eye viewing zone RZ, the right eye will see the right eye image across the whole of the display. The maximum longitudinal extent of the view point corrected stereoscopic viewing zones is indicated at LE1.

The lower part of FIG. 9 illustrates the viewing zones produced by a pixel configuration of the type illustrated in the lower part of FIG. 7. In this case, the light intensity varies angularly within the light wedges L1, R1, L2 and R2 because the pixels are of non uniform vertical aperture. Further, because the columns of pixels are spaced by vertical strip portions of the black mask of the SLM, there are "black" wedges B1 and B2 between the light wedges L1 and R1 and between L2 and R2. Thus, an observer eye positioned within the black wedge B1 or B2 will not receive light from the pixels but will instead view the black mask.

Thus, the viewing zones LZ and RZ for the pixel arrangement illustrated in the lower part of FIG. 9 are spatially restricted compared with those of the upper part of FIG. 9 and the extent LE1 of the longitudinal viewing freedom is substantially reduced compared with that for the pixel arrangement of FIG. 4. Further, the brightness will vary as the eyes of the observer move within the viewing zones LZ and RZ. Thus, pixel configurations having uniform or constant vertical aperture and of extended horizontal aperture provide greater longitudinal viewing freedom in viewpoint corrected displays.

As well as extending both lateral and longitudinal viewing freedoms, the pixel configuration of FIG. 4 substantially enhances the performance of the display within the useful viewing region. As described hereinbefore, the intensity profile is uniform across the central portion of the window. If an observer moves slightly, the mechanical system will take a time to catch up with the observer but, as the window intensity remains unchanged, no artefact will be seen.

The response speed of the tracking system is constrained by pixel shape. If an observer moves too quickly such that the tracking system cannot respond sufficiently quickly, the eye spot can move out of the pixel boundary so that image flicker is visible. It is therefore desirable for the pixel to be larger and to have a more uniform aperture so that the display is more resistant to system lags or delays.

As described hereinbefore, movement of the parallax optic 2 is quantised such that the electromechanical transducer 8 and the mechanical transmission 9 make stepwise movements among a plurality of stationary positions of the optic 2. By using pixel configurations of the type shown in FIG. 4 which provide viewing windows having wide and uniform profiles, the eye spots can move some distance within the pixels before any change in intensity or cross-talk is visible in the 3D image. Thus, the parallax optic 2 can move from one position to an adjacent position with substantially no change in the display appearance. The windows move in correspondence with movement of the parallax optic 2. The movement $\delta$ at the window plane is given approximately by:

$$\delta = w \cdot \sigma / s$$

where $\sigma$ is the parallax optic movement, s is pixel pitch and w is window size.

If the SLM 1 is of the type having horizontally non-contiguous underlapping pixels, such as an LCD with a black mask having portions forming continuous vertical strips between the pixel columns, the optimum window size is generally equal to the average interocular separation which is approximately 65 mm. However, if the pixels are substantially horizontally contiguous so as to produce substantially contiguous viewing windows, it may be advantageous to provide windows which are larger than the average interocular separation. This is because, as the observer eyes move away from the optimum position, one eye approaches a window boundary, whereas the other remains in a "good" part of the window. If the boundary quality is high, the artefact seen by the eye approaching the boundary is not too bad and the other eye sees no artefact. The overall image quality is therefore improved. For non-contiguous underlapping pixels, the use of larger windows also increases the gap between adjacent windows so that viewing freedom is reduced.

Many electromechanical systems are not able to provide high step resolution while maintaining high speed. The limit of size of the steps required is determined by the window uniformity and width. From aberrational and diffraction considerations, it has been found that a minimum of three or four steps at the window plane per interocular separation are required if the windows are full width. If the windows are of smaller width and non-uniform, a significant increase in the number of steps is required to maintain the eye spot at the "good" part of the pixel when, tracking observer movement. Systems with less than twenty steps per interocular separation have significant advantages for reduced cost and complexity. For example, a system with a pixel pitch of 100 $\mu$m and ten steps per interocular separation would only require an electromechanical system capable of 10 $\mu$m step size. Typically a sensor of the observer tracker 7 will have a resolution which is much higher than the window movement which results from this mechanical step size.

In the mechanical parts of many electromechanical arrangements for moving the parallax optic 2, there are mechanisms for backlash as an observer changes position. The relatively wide windows generated by the pixel arrangement shown in FIG. 4 allow the effects of such backlash to be reduced or eliminated. Similarly, the accuracy of observer tracking affects performance of the display and wider viewing windows allow more inaccuracy without undesirable visual artefact so that cheaper lower accuracy systems may be employed within the display for observer tracking. Also, more latency in the tracking sensor can be tolerated.

Figure 10A:
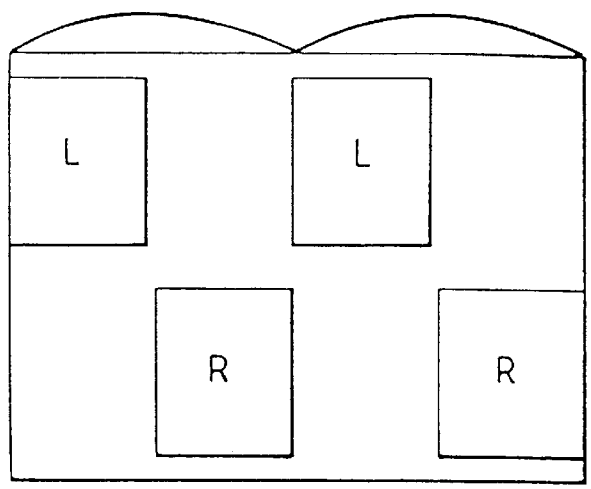
FIGS. 10a to 10d illustrate different pixel configurations for use in mechanically tracked displays.
Figure 10B:
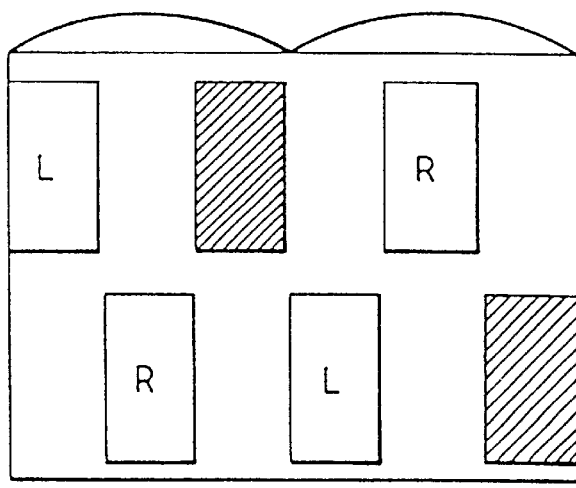
Figure 10C:
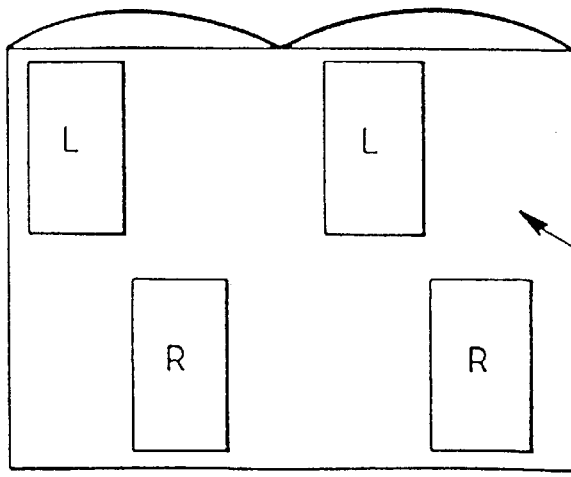

FIGS. 10a to 10d show four pixel arrangements for providing only two views FIG. 10a shows a pixel configuration of the type shown in FIG. 4 to provide high image resolution. However, undesirable cross-talk may occur because of the horizontal contiguity of the adjacent pairs of pixel columns. In order to reduce cross-talk while maintaining viewing freedom and good display resolution, the arrangements shown in FIGS. 10b and 10c may be adopted. Thus, every third column of pixels may be switched to a fixed black or grey level so as to provide horizontal spacing between the pairs of columns of pixels. Alternately, the black mask may be extended as illustrated in FIG. 10c.

Figure 10D:
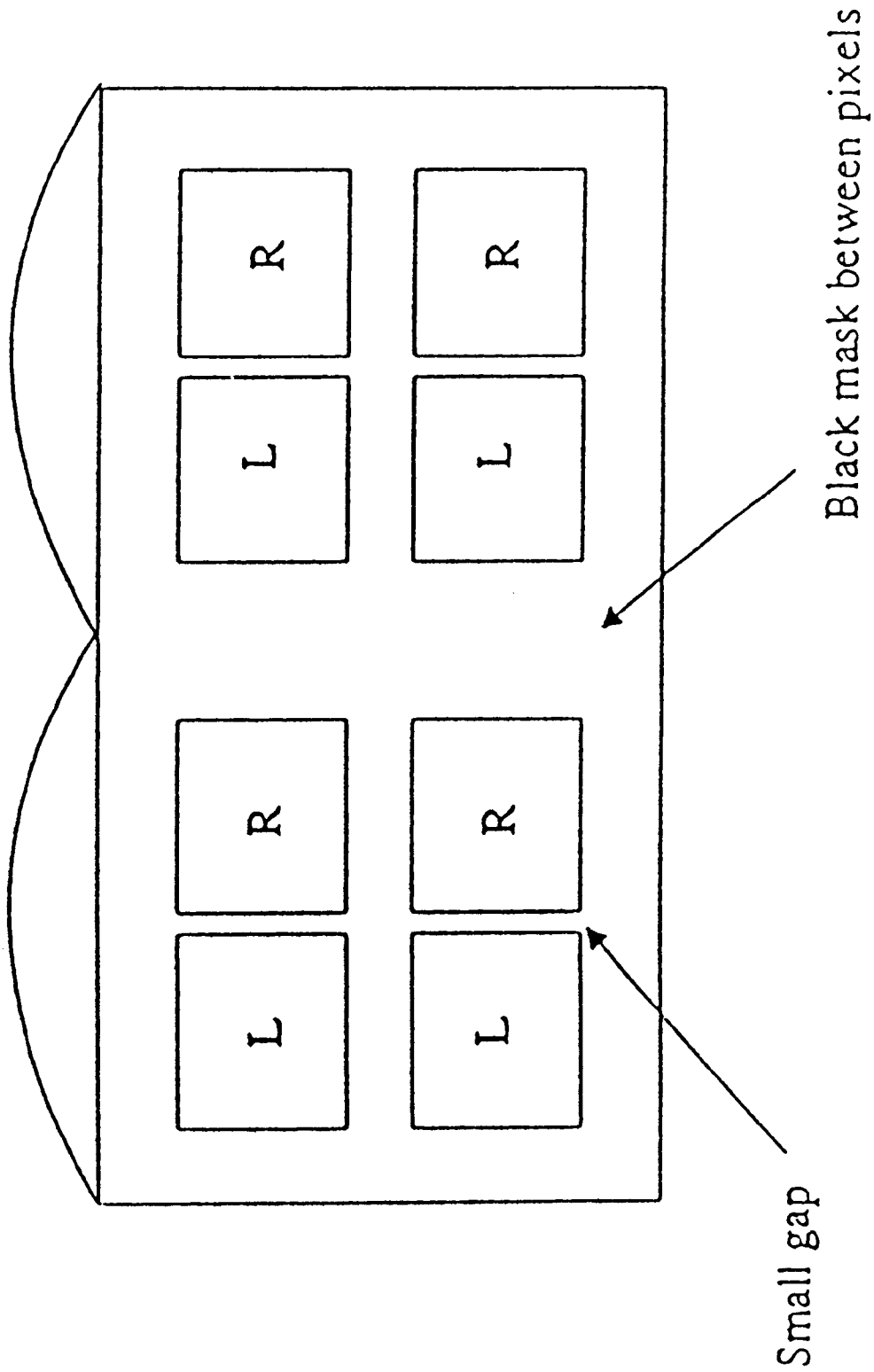

The pixel configuration illustrated in FIG. 10d allows the same windows to be generated as that illustrated in FIG. 10c. However, the vertical resolution of the display is not sacrificed and the black mask regions between the pairs of columns of pixels are maintained. Additionally, the window size can be increased to improve the visual performance of the tracking system. The width of the small gaps between the pixels in each pair of columns may be of the order of a few microns with components such as addressing electrodes, capacitors and transistors being disposed in the gaps between the pairs of pixel columns so as to be covered by the black mask. Such an arrangement provides a display with a higher aperture ratio than, that of FIG. 10c having a similar tracking performance, so that a brighter display can be provided.

Electromechanical systems which can provide quantised step size include stepper motors, DC servo motors with quantised position encoders and voice coil stages with quantised position encoders. Such systems may comprise gear systems or lead or ball screws provided the backlash is lower than the quantised step size.

In practice, the display exhibits a finite non-zero response time t between measurement of the observer position and movement of the parallax optic 2 to optimise viewing conditions for the observer position. This results from such factors as measurement latencies in the sensor of the observer tracker 7, communication time from the sensor to a control system within the tracker 7 and from the control system to the transducer 8, processing of measurement information and comparison with calibration information, and mechanical response time of the electromechanical system and the parallax optic 2.

Given such a response time and a maximum speed Vmax of observer motion which is to be catered for without visual flicker or loss of stereoscopic view information, there is an optimum step size for the display. If the response time of the system is long, then the display should not move in very fine steps as the observer can then quickly out-pace the display. Hence, the time taken by an observer to move across one increment in the viewing window position when moving at maximum speed should be matched to the system response time for making that movement.

Depending on the response time of the system, the display should be capable of moving to the best position and does not stop at intermediate positions. Thus, the display adapts to observer speed of movement to determine the best displacement. A jump may therefore cover a number of calibrated positions. Thus, the display will have a variable number of steps per instruction from the control system.

Another consideration in the step size is related to the absolute accuracy of the sensor when determining the position of the observer. If the sensor determines the position with a random error of maximum size $\Delta x$, there is no point in the display having a window step size of less than this value.

Combining these considerations allows the optimum base number n of steps per interocular distance e to be assessed as:

$$e/n = V_{max}.t + \Delta x$$

For instance, in a system with a response time of 25 milliseconds with a sensor accuracy of 5 millimetres, for a maximum observer speed of 300 millimetres per second, the appropriate number of steps per interocular distance (approximately 63 millimetres) is 5, thus giving a step size of approximately 12.5 millimetres. For an LCD with a pixel pitch of 100 $\mu$m, this corresponds to a 20 $\mu$m movement of the parallax optic.

The optimum step size derived from the above equation is valid only at the window plane. Away from the window plane, the step size given by the equation may be close to or greater than the actual usable window width. In this case, the optimum step size becomes a fraction of the actual usable window width (ie: the lateral freedom in the viewing region) at the viewing distance and the maximum allowed observer lateral speed Vmax must decrease. Thus, the number of stationary points may be varied with longitudinal observer position. This means that the display may respond more accurately but more slowly for an observer positioned out of the window plane. The same basic calculation of step size may apply but the effective window width is changed accordingly with longitudinal position as the observer moves around within the viewing regions. Alternatively, the number of steps may be increased to some maximum so as to minimise the loss in tracking speed while providing some improvement in tracking accuracy. A suitable form of correction to calculate an adjusted number n' of discrete stationary positions per interocular separation.

For instance, the following expression may be used to calculate an adjusted number n' of discrete stationary positions per interocular separation:

$$n' = n + (2/\Delta z //\Delta L)(e/\Delta x - n)$$

where $/\Delta n/$ is the absolute value of the distance from the current longitudinal or z position of the observer to the optimum viewing distance and $\Delta L$ is the longitudinal length of the viewing regions. However, other methods of determining the change in n' with observer z position exist, including empirical methods. The choice of method depends, at least in part, on the properties of the mechanical system and controls to adjust the step size.

Thus, quantising the movement of the display has advantages in detailed product development and takes into account the practical response of control systems.

Calibration of the display is made simpler as only certain discrete positions need to be calibrated.

Calibration of the display may, for example, be performed as described in EP 0 769 881. In particular:

1. Calibration is performed as described in EP 0 769 881 for typically six to ten positions across the lateral range of the display;
2. This calibration is used to produce interpolated calibrations typically for 20 to 40 positions. These positions may be many steps apart but are the minimum step size addressable using the control system;
3. During tracking operation:
   a Tracking data are received, for instance as x and y and z co-ordinates;
   b Prediction used to correct co-ordinates due to latency in the tracking control;
   c x and z coordinates are compared with stored calibration lines to find the nearest line;

d The electromechanical system is commanded to move to the appropriate position;

e Control returns to step (a).

Alternately, the data from the observer tracker may represent angular information of the observer position with respect to the display. In parallax optic displays, each linear translation of the parallax optic causes an angular shift in the viewing zones so that, if the optical axes of the display and the tracking system coincide, the angular observer position can be used directly to determine the required position of the parallax optic. In this case, the calibration points are purely related to the angular observer position and, for each angular position, there is a unique corresponding position of the electromechanical system. Otherwise, operation of the display is as described hereinbefore.

This control arrangement has several advantages. Because only a limited number of tracking position steps is required, there is only a limited number of calibration points. The memory of the control system may, therefore, be limited. Also, the number of calculations which must be performed to find the nearest calibration line is limited so that the system latency is reduced. The speed of the control system and the cost of the component parts may, therefore, be reduced without any significant reduction in display performance. This contrasts with a continuous tracking system in which continuous on-line calibration best-fit would be required in order to find the best parallax optic position. This would lead to increase display cost and reduced tracking efficiency.

As mentioned briefly hereinbefore, the parallax optic 2 may be moved longitudinally in a stepwise manner as illustrated in FIG. 11. As a result of such longitudinal movement, the window plane containing the windows 50 moves longitudinally relative to the display but the window sizes remain of constant width. However, the viewing zones change in size longitudinally.

The position data obtained by the observer tracker 7 may be used so that the observer is substantially maintained at the window plane. The window plane is then always substantially at the optimum position for lateral tracking because the window size is at its largest. This allows greater reduction in tolerance requirements of the system and can further reduce the step size of the mechanical tracking system, thus reducing cost and increasing robustness. Further, the available viewing region for the observer is substantially increased in size, particularly in the longitudinal depth range.

FIG. 12 illustrates at 55 the allowed viewing range of an observer for 3D autostereoscopic viewing. The lateral or horizontal allowed viewing range 55 is limited, as indicated at 56 and 57, by optical performance such as optical aberration of a lenticular screen. The vertical viewing range is limited at 58 and 59 by the geometric construction of the display and by optical aberrations of the parallax optic. Outside the range 55, it is not possible to perceive a 3D image.

The performance of the display may be improved by switching off the display when the observer tracker detects that the observer is outside the range 55. The observer tracker supplies out of range tracking information 60 which may be used, as shown diagrammatically in FIG. 12, to switch off the backlight 10 so as to prevent incorrect viewing. Alternately, this information may be used to switch off the SLM 1. Further, the intensity of the image may be made to fade as the observer moves towards the edges of the viewing range 55. In this way, the limited viewing freedom is made to feel more natural to an observer.

As shown in FIG. 13, the parallax optic 2 may be tilted relative to the SLM 1 so as to change the distances of the windows for observers located away from the central axis of the display. This may be adopted in addition to a lateral tracking system so as to provide improved viewer freedom. Tilting may be performed in a stepwise manner as described hereinbefore.

Switching between 3D and 2D modes may be performed mechanically and may use the same mechanism provided for observer tracking. Embodiments for achieving this are shown in FIGS. 14 and 15. In FIG. 14, the parallax optic comprises superimposed masks 66 and 67 which are movable relative to each other. Each of the masks comprises a plurality of transparent stripes separated by checkerboard patterns of transmissive and non-transmissive square regions. The checkerboard patterns of the masks 66 and 67 are complementary to each other so that, when the masks are aligned as shown in the upper part of FIG. 14, the transmissive stripes are aligned to form the parallax optic but, in the intervening regions, each transmissive square of each of the masks 66 and 67 is aligned with a non-transmissive region of the other mask. Thus, as shown at 68, the vertical slits 69 are separated from each other by non-transmissive regions such as 70 and 71.

When the masks 66 and 67 are displaced laterally relative to each other as shown diagrammatically at the lower part of FIG. 14, the resulting optical component has the transmission properties illustrated at 72. In this case, the SLM displays a regular array of transmissive and non-transmissive regions so that the directional restrictions on viewing the display are removed and 2D images at the full resolution of the SLM 1 may be displayed. The vertical size of the checkerboard regions are chosen to minimise Moiré beating between the LCD pixels and the checkerboard pattern.

In FIG. 15, the masks 66 and 67 differ from those shown in FIG. 14 in that the patterns between the vertical transmissive strips are made up of strip polarisers whose polarisation directions are shown by the arrows. With the relative positions shown at the upper part of FIG. 15, the strips of the two masks 66 and 67 are aligned whereas each polarised region of the mask 67 is aligned with a strip of the orthogonal polarisation. Thus, a parallax barrier as illustrated at 68 is produced.

When the relative position of the masks 66 and 67 are as shown at the lower part of FIG. 15, regions or strips of the masks 66 and 67 of the same polarisation are aligned with each other. Also, the transmissive strips are each aligned with a polarising strip. Thus, the parallax optic 2 operates as a polariser to allow the display to be observed from a greater range of angles for the 2D mode. The polarisation directions of the strips are aligned at 45 degrees to the output polarisation of the SLM 1 when, for instance, embodied as an LCD. Alternately, 90 degree polarisation rotators may be disposed on the sheet nearest the LCD to reorient the polarisation to the second polariser sheet, this being more light efficient.

FIG. 16 illustrates another type of parallax barrier 2 which may be used to switch between autostereoscopic 3D viewing and 2D full resolution non-directional viewing. The parallax barrier comprises a first layer comprising strips of 90 degrees polarisation rotators such as $\lambda/2$ plates 75 which are separated by regions such as 76 which do not substantially affect the polarisation of the transmitted light. A polarising sheet 77 whose polarising axis is oriented vertically is disposed between the observer and the first sheet. When illuminated by polarised light in the direction 78 (such as the polarised output from an LCD) and with the direction of polarisation 79, light passes through the neutral regions 76 but is blocked by the polarising sheet 77. The λ/2 strips 75 rotate the polarisation of the incident light by 90 degrees so that the polarising sheet 77 transmits this light. The device therefore functions as a parallax barrier. For operation in the 2D mode, the polarising sheet 77 is removed and the regions. 76 and waveplates 75 transmit the light. Alternately, the polarising sheet 77 may be aligned with the polarisation direction 79 and the λ/2 strips wound in and out to give the 3D and 2D modes, respectively. in this case, in the 3D mode, the λ/2 strips define the dark regions and the clear areas define the transmissive slits. The absorbtion of the neutral (non-polarising) regions can be made the same as the absorbtion loss of the polarisers so that the visibility of the chequerboard arrangement is minimised while providing the switchable modes. When changing between the 2D and 3D modes, it is also necessary for the image display to the correct format.

In such an arrangement, the sheet comprising the regions 76 and the waveplates 75 is moved to provide observer tracking but the polarising sheet 77 need not move and may be made detachable. The polarising sheet 77 need only be aligned in rotation and not in lateral registration, thus simplifying assembly. Such an arrangement may be made relatively slim and the separation between the polarising sheet and the first sheet does not affect operation. Thus, the polarising sheet may be stuck on the outside of the main unit if required or may even by worn in the form of glasses. Optical efficiency is relatively high because there is only one polariser absorption loss in the 3D mode and full brightness is provided in the 2D mode.

FIG. 17 illustrates schematically an arrangement for switching the arrangement of FIG. 16 between the 3D and 2D modes. The polarising sheet 77 is connected to a clear film which may then be wound across the front of the display by a mechanism 80 such that the polarising sheet is in front of the display for the 3D mode and the clear film is in front of the display for the 2D mode.

The arrangement of FIG. 17 may be modified by replacing the λ/2 plates 75 with +λ/4 plates and replacing the regions 76 with −λ/4 plates. The polarising sheet 77 is replaced by a sandwich arrangement comprising a +λ/4 sheet and a polarising sheet.

As described hereinbefore, the window size at the optimum viewing distance i.e. in the window plane, does not change if the parallax optic 2 is moved longitudinally with respect to the LCD 1. Thus, for any given lateral movement of the observer, the parallax optic will always move by a constant distance so as to compensate for observer movement in the window plane. The lateral calibration of the display does not therefore vary with longitudinal window distance. When the observer is positioned at the window plane, the display operates with reduced visual artefacts so that it is preferable for the observer to stay in the window plane. Mechanical tracking systems which automatically track the observer longitudinally can be expensive and difficult to manufacture robustly.

Figure 18:
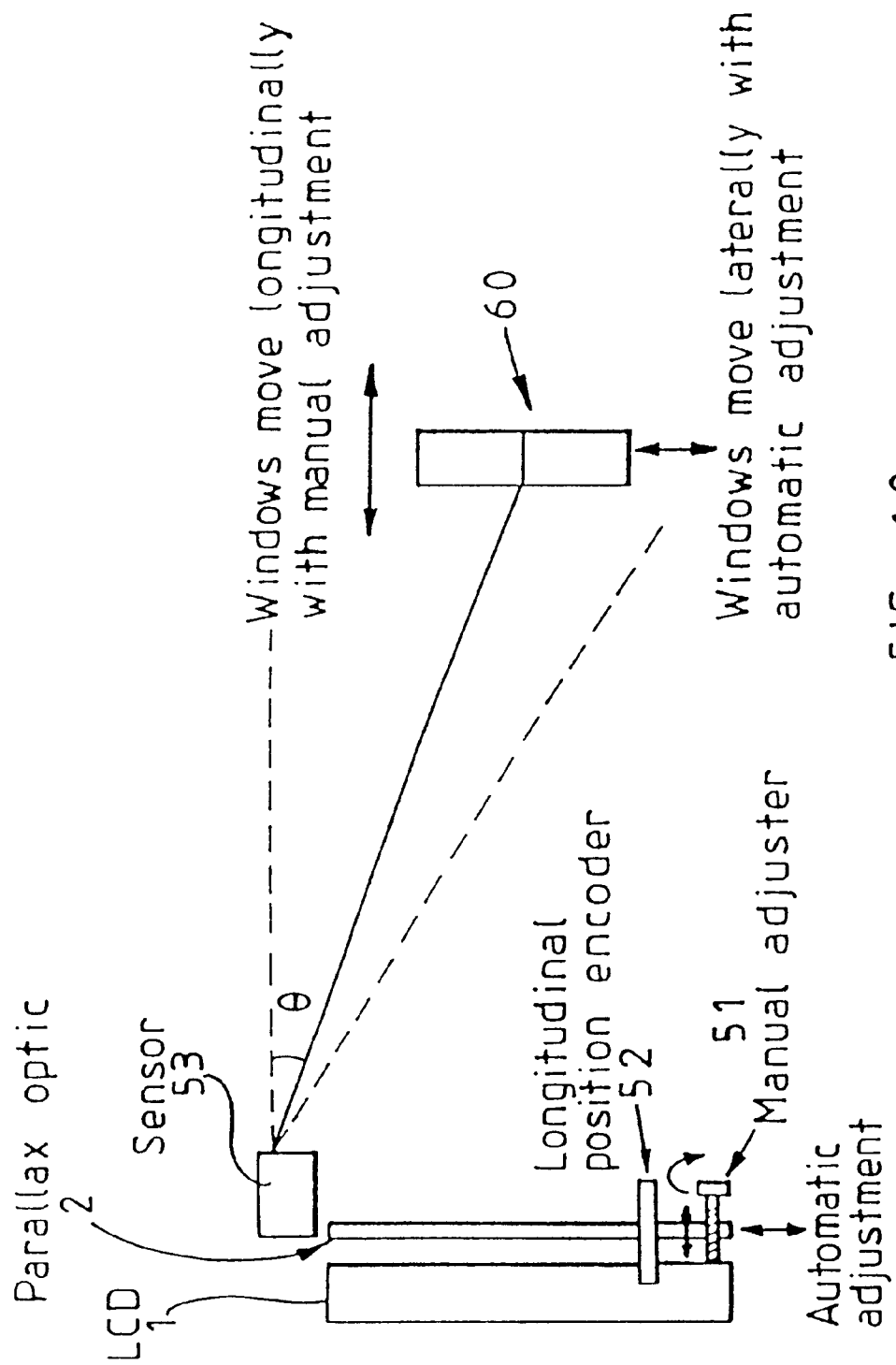
FIG. 18 is a diagram illustrating a display constituting another embodiment of the invention.

FIG. 18 illustrates an alternate manual arrangement for longitudinal observer tracking. This arrangement continues to provide automatic mechanical lateral tracking of the observer. However, the position of the parallax optic 2 relative to the LCD 1 is manually adjustable by an adjuster 51, for instance of a simple screw adjustment type. Optionally, a longitudinal position encoder 52 is provided to supply a signal corresponding to the longitudinal position of the parallax optic 2 relative to the LCD 1.

In use, the observer positions himself at the most comfortable position with respect to the display. The observer then manually adjusts the longitudinal position of the parallax optic 2 by means of the adjuster 51 so as to give the best image quality i.e. so that the parallax optic 2 is positioned so as to maintain the window plane at the observer. Because the lateral calibration has not changed, the display continues to track the observer accurately for lateral movement. It is thus possible to provide a simple robust system which is cost-effective for providing enhanced viewing freedom.

What is claimed is:

1. An observer tracking directional display comprising an image display, a parallax device co-operating with the image display to define at least one viewing zone from which the image display is visible, and an observer tracker for determining the position of an observer, wherein the observer tracking directional display further comprises an electromechanical system responsive to the observer tracker for moving the parallax device relative to the image display in discrete steps from any of a plurality of pre-selected steps to any other of the plurality of pre-selected discrete stationary positions so that the viewing zone tracks the position of the observer, and when moving the parallax device from any of the plurality of pre-selected steps to any other of the plurality of pre-selected steps having a plurality of intermediate steps therebetween, movement of the parallax device need not stop at each intermediate step therebetween.

2. A display as claimed in claim 1, wherein the electromechanical system is arranged to provide, at least for an observer at a predetermined longitudinal distance from the display, a number n of discrete stationary positions of viewing windows per interocular distance e given by:

$$e/n = V\max.t + \Delta x$$

where Vmax is the maximum lateral observer speed for the display, Δx is the lateral position error of the observer tracker and t is the time delay between measurement of an observer position and completion of relative movement between the parallax device and the image display to track an observer movement.

3. A display as claimed in claim 2, wherein the electromechanical system is arranged to provide, for an observer at least one longitudinal distance from the display, different from the predetermined distance, a number n' of discrete stationary positions of the viewing windows per interocular distance greater than n.

4. A display as claimed in claim 1 for three dimensional autostereoscopic viewing, wherein the image display is arranged to display spatially multiplexed left and right images and the parallax device is arranged to co-operate with the image display to form left and right viewing windows for left and right eyes, respectively.

5. A display as claimed in claim 1, wherein the image display comprises a plurality of picture elements each of which is of substantially constant vertical aperture across its horizontal aperture.

6. A display as claimed in claim 5, wherein each of the picture elements is of substantially rectangular shape.

7. A display as claimed in claim 5, wherein the picture elements are arranged as pairs of columns with the columns of each pair being substantially horizontally contiguous.

8. A display as claimed in claim 6, wherein the pairs of columns are spaced apart horizontally.

9. A display as claimed in claim 1, wherein the image display comprises a spatial light modulator and a backlight.

10. A display as claimed in claim 9, wherein the spatial light modulator comprises a liquid crystal device.

11. A display as claimed in claim 1, wherein the parallax device comprises a lens array.

12. A display as claimed in claim 11, wherein the lens array comprises a lenticular sheet.

13. A display as claimed in claim 1, wherein the parallax device comprises a hologram array.

14. A display as claimed in claim 1, wherein the parallax device comprises a parallax barrier.

15. A display as claimed in claim 14, wherein the parallax barrier is switchable to a state of uniform transparency for switching the display to a non-directional mode.

16. A display as claimed in claim 15, wherein the parallax barrier comprises first and second sheets which are laterally relatively movable between first and second relative positions, the first sheet comprising a plurality of first transmissive strips separated by first patterns of transmissive and non-transmissive regions, the second sheet comprising a plurality of second transmissive strips separated by second patterns of transmissive and non-transmissive regions which are complementary to the first patterns and arranged such that, in the first relative position, the first strips are aligned with the second strips and the non-transmissive regions of the first and second patterns are aligned with the transmissive regions of the second and first patterns, respectively, and such that, in the second relative positions, the first and second transmissive strips are aligned with the second and first patterns, respectively, and the transmissive regions of the first and second patterns are aligned with each other.

17. A display as claimed in claim 15, wherein the parallax barrier comprises superimposed first and second sheets which are laterally relatively movable between first and second relative positions, the first sheet comprising a plurality of first transmissive strips, each pair of which is separated by alternate strips of first and second orthogonal polarisations, the second sheet comprising a plurality of second transmissive strips, each pair of which is separated by alternate strips of the second and first polarisations such that, in the first relative position, the first transmissive strips are aligned with the second transmissive strips and the strips of the first and second polarisations of the first sheet are aligned with the strips of the second and first polarisations, respectively of the second sheet and such that, in the second relative position, the strips of the first and second polarisations of the first sheet are aligned with the strips of the first and second polarisations, respectively, of the second sheet.

18. A display as claimed in claim 15, wherein the image device is arranged to supply light which is polarised in a first direction and the parallax barrier comprises: a patterned polarisation rotator having first slit-shaped regions separated from each other by second regions, the first and second regions being arranged to supply light of orthogonal first and second polarisations, respectively; and a polariser arranged to transmit light of the first polarisation and substantially to block light of the second polarisation.

19. A display as claimed in claim 1, wherein the image display is a light-emissive display.

20. A display as claimed in claim 1, wherein the separation of viewing windows corresponding to adjacent ones of the discrete stationary positions is greater than the accuracy of the observer tracker.

21. A display as claimed in claim 1, wherein the electromechanical system comprises an electromechanical transducer connected by a mechanical transmission to the image display or the parallax device.

22. A display as claimed in claim 21, wherein the transducer comprises a stepper motor.

23. A display as claimed in claim 21, wherein the transducer comprises a servo motor.

24. A display as claimed in claim 21, wherein the transducer comprises a voice coil stage.

25. A display as claimed in claim 22, wherein the electromechanical system comprises a relative movement step encoder.

26. A display as claimed in claim 23, wherein the electromechanical system comprises a relative movement step encoder.

27. A display as claimed in claim 24, wherein the electromechanical system comprises a relative movement step encoder.

28. A display as claimed in claim 22, wherein the electromechanical system comprises a relative position reference detector.

29. A display as claimed in claim 23, wherein the electromechanical system comprises a relative position reference detector.

30. A display as claimed in claim 24, wherein the electromechanical system comprises a relative position reference detector.

* * * * *